US010543715B2

(12) United States Patent
Ryshavy et al.

(10) Patent No.: US 10,543,715 B2
(45) Date of Patent: Jan. 28, 2020

(54) WHEEL CENTERING SLEEVE

(71) Applicant: Stempf Automotive Industries, Inc., Minnetonka, MN (US)

(72) Inventors: John W. Ryshavy, Wayzata, MN (US); William C. Fitzgerald, Brooklyn Park, MN (US); David Jon Emanuelson, Stanhope, IA (US); Shawn Christopher Miller, Milaca, MN (US)

(73) Assignee: Stempf Automotive Industries, Inc., Minnetonka, MN (US)

( * ) Notice: Subject to any disclaimer, the term of this patent is extended or adjusted under 35 U.S.C. 154(b) by 331 days.

(21) Appl. No.: 15/259,927

(22) Filed: Sep. 8, 2016

(65) Prior Publication Data

US 2018/0065411 A1    Mar. 8, 2018

(51) Int. Cl.
| | | |
|---|---|---|
| *B60B 3/14* | (2006.01) | |
| *B60B 29/00* | (2006.01) | |
| *F16B 43/00* | (2006.01) | |
| *B60B 27/02* | (2006.01) | |

(52) U.S. Cl.
CPC ............. *B60B 3/147* (2013.01); *B60B 27/02* (2013.01); *B60B 29/001* (2013.01); *F16B 43/00* (2013.01); *B60B 2900/541* (2013.01)

(58) Field of Classification Search
CPC ........... B60B 3/14; B60B 3/145; B60B 3/147; B60B 29/001; F16B 43/00
See application file for complete search history.

(56) References Cited

U.S. PATENT DOCUMENTS

| | | | |
|---|---|---|---|
| 1,618,887 A | | 2/1927 | Putnam |
| 1,969,233 A | * | 8/1934 | Patterson .............. B60B 29/001 |
| | | | 29/273 |
| 2,017,114 A | | 10/1935 | Winchester |
| 2,150,111 A | | 3/1939 | Tatter |
| 2,533,707 A | | 12/1950 | Ash |
| 2,545,130 A | | 3/1951 | Ash |
| 2,755,539 A | * | 7/1956 | Weynand ............ B25B 27/0035 |
| | | | 29/245 |
| 2,844,409 A | | 7/1958 | Eksergian |
| 3,960,047 A | | 6/1976 | Liffick |
| 3,978,573 A | * | 9/1976 | Williams ................ B25B 27/28 |
| | | | 29/267 |
| 4,240,670 A | | 12/1980 | Zorn et al. |
| 4,431,353 A | | 2/1984 | Capuano |
| 4,858,298 A | * | 8/1989 | Fleischanderl ....... B60B 29/001 |
| | | | 29/273 |
| 4,898,429 A | | 2/1990 | Plumer |

(Continued)

FOREIGN PATENT DOCUMENTS

DE    2362837    7/1974

OTHER PUBLICATIONS

Midwest Wheel Companies. "Wheel Centering Products". www.midweststeel.com. Available as of Dec. 9, 2015.

(Continued)

*Primary Examiner* — Jason R Bellinger
(74) *Attorney, Agent, or Firm* — Haugen Law Firm PLLP

(57) ABSTRACT

A corrosion-resistant wheel centering sleeve is provided to aid in centering a wheel about a wheel hub. The wheel centering sleeves have an adjustable thickness in order to coordinate with various-sized gap spaces in the wheel hole between the wheel and the stud.

37 Claims, 24 Drawing Sheets

(56) References Cited

U.S. PATENT DOCUMENTS

| | | | |
|---|---|---|---|
| 4,971,498 A | 11/1990 | Goforthe | |
| 5,042,151 A * | 8/1991 | Roush | B25B 27/14 |
| | | | 29/213.1 |
| 5,454,628 A * | 10/1995 | Maiworm | B60B 1/08 |
| | | | 301/35.632 |
| 5,597,279 A | 1/1997 | Thomas et al. | |
| D387,657 S | 12/1997 | Holmes | |
| 6,070,946 A | 6/2000 | Holmes | |
| 7,111,909 B2 | 9/2006 | Andersen | |
| 7,178,880 B2 | 2/2007 | Andersen | |
| 7,513,514 B1 | 4/2009 | Schlosser | |
| 8,752,907 B2 * | 6/2014 | Andersen | B60B 11/02 |
| | | | 29/894.321 |
| 8,955,920 B2 * | 2/2015 | Yoon | B60B 3/044 |
| | | | 301/35.627 |
| 2005/0126020 A1 | 6/2005 | Gerdes et al. | |
| 2007/0257546 A1 | 11/2007 | Mitchel | |

OTHER PUBLICATIONS

Alcoa. "Aluminum Truck Wheel Service Manual and Operating Instructions." Dec. 1994.

* cited by examiner

WHEEL CENTERING SLEEVE

FIELD OF THE INVENTION

The present invention relates to vehicle wheels generally, and more particularly to devices for aiding in the mounting and maintenance of wheels concentrically on a hub.

BACKGROUND OF THE INVENTION

Wheels are typically mounted on a vehicle using lug nuts or stud nuts, which threadably engage with studs extending from the hub or axle. The wheels include a plurality of holes that are arranged about the center axis and positioned to receive the studs. In order to most easily receive the studs therethrough, the wheel holes are slightly oversized in diameter with respect to the stud diameter. Properly aligning the wheel to the hub has in the past required maintaining an appropriate position of the wheel at the studs while threading the stud nuts onto the studs, so as to lock the wheel in position. Maintaining the wheel in the correct position during this locking procedure has proven to be difficult.

One approach to assisting in the proper alignment of the wheel on the hub is the hub-piloted wheel system, which is designed to position the wheel onto the hub with tighter tolerances than that achievable merely through attempts to align the wheel holes concentrically about the respective studs. In such hub piloted systems, the wheel hub is provided with hub pilot pads that are positioned circumaxially about the hub, and extend radially outwardly in an effort to take up any excess space between the wheel and the hub.

However, even with hub piloted systems, stresses on the wheel assembly can result in a "clocking" action of the wheel on the studs, and can lead to a loss of torque applied to the wheel rim by the stud nuts. The "clocking" movement results from the clearance or gap space between the each stud and the wheel hole. Typical wheel studs have a diameter of 22 mm, while the wheel holes have a manufactured diameter of 26 mm. The 2 mm radial gap space is provided to ease installation of the wheel on the studs, as well as to reduce corrosion of the adjacent components. Improper tightening of the stud nuts can lead to ineffective pressure applied by the nuts to the wheel, which can allow the wheel to move with respect to the studs, otherwise known as clocking.

Various solutions have been proposed in an attempt to address improper seating of the wheel on the studs. In some cases, alignment pins are temporarily placed at some of the studs to fill the radial gap space at such studs, so that stud nuts may be secured and torqued appropriately at the remaining studs, theoretically securing the wheel correctly in place. The alignment pins may thereafter be removed and replaced by stud nuts for final installation of the wheel.

Other proposed solutions have employed flanged stud nuts, wherein the flange protrudes into the radial gap space between the stud and the wheel when the stud nut is threaded onto the stud. In still further proposed solutions, sleeve members are directly threaded onto the studs to fill the gap space between the stud and the wheel at the wheel hole.

The previously proposed solutions, however, have drawbacks in that the components designed for filling the gap space in the wheel hole between the stud and the wheel are made from metal, and are susceptible to corrosion over time. Corroded components in tightly adjacent positions can seize the components, making removal of the wheel from the hub very difficult. Moreover, attempts to precisely fill the gap space with a pre-manufactured metal component has proven elusive, particularly where corrosion of the wheel at the wheel hole and of the stud can significantly alter the originally-manufactured dimensions. In such case, the gap filling devices fail to completely fill the gap, and they therefore fail to solve the "clocking" problem described above.

It is therefore an aspect of the present invention to provide a device for centering wheels on a hub, wherein the device is corrosion-resistant, and is capable of accommodating various gap space sizes while still completely bridging the gap space between the stud and wheel at the wheel hole.

It is another aspect of the present invention to provide a tool that is specifically adapted for cooperation with a wheel centering sleeve, both to install the wheel centering sleeve in the gap space between the stud and wheel at the wheel hole, and, optionally, to remove the wheel centering sleeve from the wheel hole.

SUMMARY OF THE INVENTION

By means of the present invention, wheels and other components may be reliably centered about a vehicle hub by customizably filling a gap space in a hole between the component and the stud. The centering sleeves of the present invention are designed with an adjustable thickness, through one or both of compressibility and friability, wherein installation of the centering sleeve into the gap space adjusts the centering sleeve thickness to match the gap space. In this manner, excess space between the centering sleeve and one or both of the stud and the wheel is prevented. In addition, the centering sleeve of the present invention is corrosion-resistant to minimize negative implications of environmental exposure.

In one embodiment, a wheel centering sleeve of the present invention is provided for engagement between a wheel stud and a wheel rim within a stud hole of the wheel rim to center the wheel rim about a hub. The wheel centering sleeve includes a body having an axis and a wall extending at least partially circumaxially about the axis. The wall has an exterior surface and an interior surface defining a first thickness therebetween, and first and second axial ends defining an axial length of the body. The body includes a fin extending from the exterior surface between the first and second ends, wherein the fin is at least one of: (i) more compressible than the wheel rim, and (ii) more friable than the wheel.

A method for centering the wheel rim about the hub includes installing the wheel about the hub so that the wheel studs are received through the stud holes, and installing the wheel centering sleeve into a respective stud hole between the wheel stud and the wheel.

In another embodiment, a wheel centering sleeve is provided for positioning a wheel concentrically about a hub, wherein the sleeve is installable in an annular gap in a wheel hole between the wheel stud and the wheel. The gap has a gap space defined radially between the wheel stud and the wheel when the wheel stud is concentrically within the wheel hole. The sleeve includes a substantially cylindrical tubular wall that defines a central axis passing through first and second open ends of the sleeve. The tubular wall has an interior surface defining an inner diameter, and an exterior surface having a plurality of fins extending radially outwardly therefrom and circumaxially spaced apart around the exterior surface. The fins define an outer diameter of the sleeve, with an initial thickness of the sleeve being defined as one-half of the difference between the outer diameter and the inner diameter, with the initial thickness being larger than the gap space.

A centering sleeve of the present invention is provided for aligning a component with a vehicle hub, wherein the vehicle hub has studs extending therefrom which are receivable through mounting holes in the component when mounting the component to the hub. The centering sleeve is installable in a gap in the mounting hole between the stud and the component, and the centering sleeve includes a substantially tubular wall that defines a central axis passing through first and second open ends of the sleeve. The tubular wall has in interior surface defining an inner diameter, an exterior surface defining a sleeve thickness between the interior and exterior surfaces, and an aperture in the tubular wall that extends through the sleeve thickness.

A method for removing the centering sleeve from engagement with a respective stud includes inserting a tool into the aperture, manipulating the tool to enlarge the inner diameter of the tubular wall, and axially displacing the centering sleeve with respect to the stud.

A centering sleeve of the present invention for aligning a component with a vehicle hub, wherein the vehicle hub includes studs extending therefrom and which are receivable through mounting holes in the component. The centering sleeve is installable in a gap in the mounting hole between the stud and the component, with the gap having a gap space defined radially between the stud and the component when the stud is concentrically within the mounting hole. The centering sleeve includes a substantially tubular wall that defines a central axis passing through first and second open ends of the sleeve, wherein the tubular wall is radially compressible to be installable into the gap.

A kit for aligning a component with a vehicle hub includes the centering sleeve and a tool that is configured for rotating the centering sleeve about the central axis through engagement to the one or more engagement features. The tool includes a head portion that is specifically configured for engagement with the one or more engagement features of the centering sleeve.

A method for aligning a component with a vehicle hub includes mounting the component to the vehicle hub so that the studs extend through respective mounting holes of the component, and positioning the centering sleeve of the kit circumaxially about a respective stud, with the first end of the centering sleeve oriented toward the component. The method further includes engaging the head portion of the tool of the kit to the one or more engagement features, and applying one or more of an axial force to the tool along the central axis, and a rotational force to the tool circumaxially about the central axis while the head portion of the tool is engaged to the one or more engagement features, so that the first end of the centering sleeve is pressed into the gap.

A tool is provided in the present invention for installing and detaching a wheel centering sleeve with respect to vehicle wheel, wherein the wheel centering sleeve has a substantially tubular wall with an interior surface defining an inner diameter and an exterior surface defining an exterior diameter and a sleeve thickness between the interior and exterior surfaces. The tool includes a first portion having a channel and a channel axis, and first and second axially opposed open ends communicating with the channel. The first portion of the tool includes a head adjacent to the first open end and is specifically configured to engage with one or more engagement features of the wheel centering sleeve. A second portion of the tool includes a key with a substantially cylindrical insert portion having an outer diameter that is smaller than the inner diameter of the wheel centering sleeve, and a brace portion connecting the insert portion to a handle portion. The brace portion defines a bearing surface for contacting the centering sleeve.

DETAILED DESCRIPTION OF THE PREFERRED EMBODIMENTS

The objects and advantages enumerated above together with other objects, features, and advances represented by the present invention will now be presented in terms of detailed embodiments described with reference to the attached drawing figures which are intended to be representative of various possible configurations of the invention. Other embodiments and aspects of the invention are recognized as being within the grasp of those having ordinary skill in the art.

For the purposes hereof, the terms "wheel" and "drum" are intended to refer to structures or components that may be secured to a vehicle hub. The types of components most commonly implicated in the present invention are those used in larger vehicles, such as semi-tractors and trailers, and may be any of the steering axle wheels, drive axle wheels, driven axle wheels, and brake drums. Any application, however, that may benefit from an appropriate alignment at or about a vehicle hub, in which a component receives the hub studs through holes are contemplated as being germane to the wheel centering sleeves of the present invention, and methods of use thereof.

Figure 1:
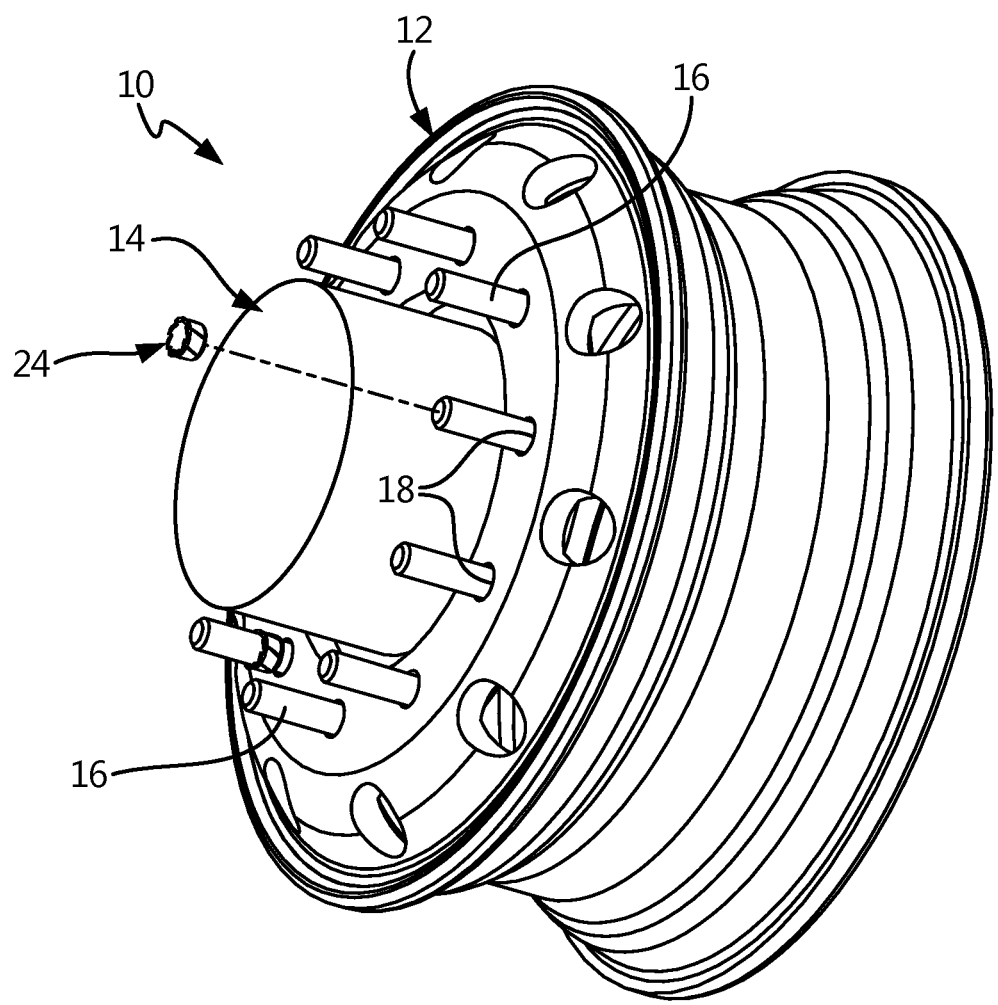
FIG. 1 is a schematic illustration of centering sleeves being mounted in wheel holes between respective studs and the wheel.

With reference now to the drawing figures, and first to FIG. 1, an example embodiment of a wheel assembly 10 is shown with a wheel 12 mounted to a hub 14 by wheel studs 16 being received through respective stud holes 18 of wheel 12. The wheel assembly 10 of FIG. 1 may be, for example, a single-tire wheel coupled to a front steering axle. Other wheel designs and wheel assemblies, however, are contemplated as being applicable to the present invention.

Figure 2:
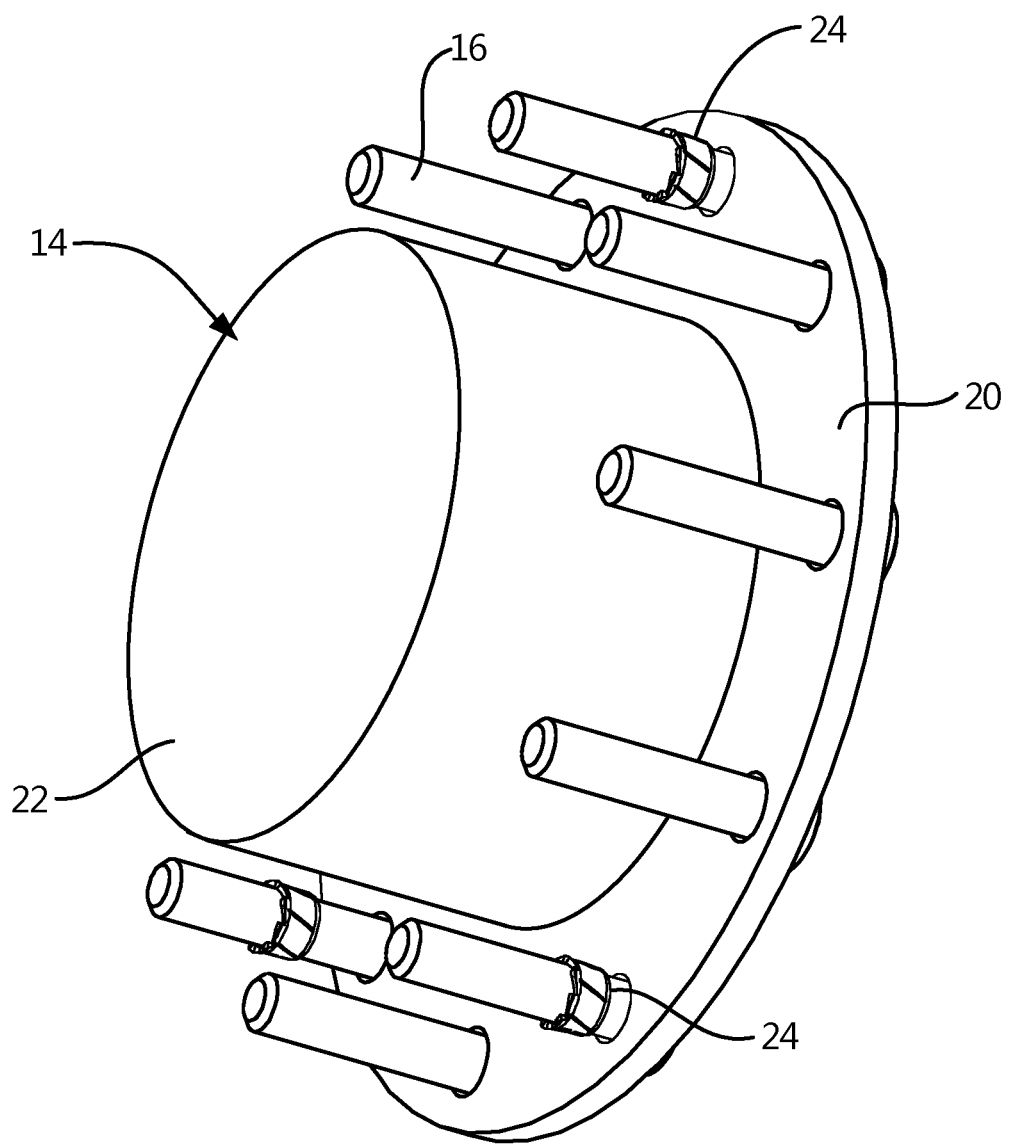
FIG. 2 is a schematic illustration of centering sleeves being mounted to studs at a vehicle hub.

Hub 14 is illustrated separately from wheel 12 in FIG. 2, wherein a plurality of wheel studs 16 extend from a hub flange 20, and spaced circumaxially about a hub core 22. Studs 16 may be provided in the form of bolts separately secured through respective apertures in hub flange 20, or may alternatively be integrally formed with hub flange 20. Typically, studs 16 are threaded so that stud nuts may be threaded onto studs 16 to secure wheel 12 to hub 14.

An embodiment of a wheel centering sleeve 24 of the present invention is illustrated being installed onto and/or circumaxially about respective studs 16, and particularly for positioning between stud 16 and wheel 12 in the stud hole 18. As will be described in greater detail hereinbelow, wheel centering sleeve 24 is preferably configured to substantially or completely fill a gap space between a respective wheel stud 16 and wheel 12 in the hole 18, so that wheel 12 is not permitted to move with respect to studs 16 when stud nuts are properly installed to secure wheel 12 to hub 14.

Figure 3:
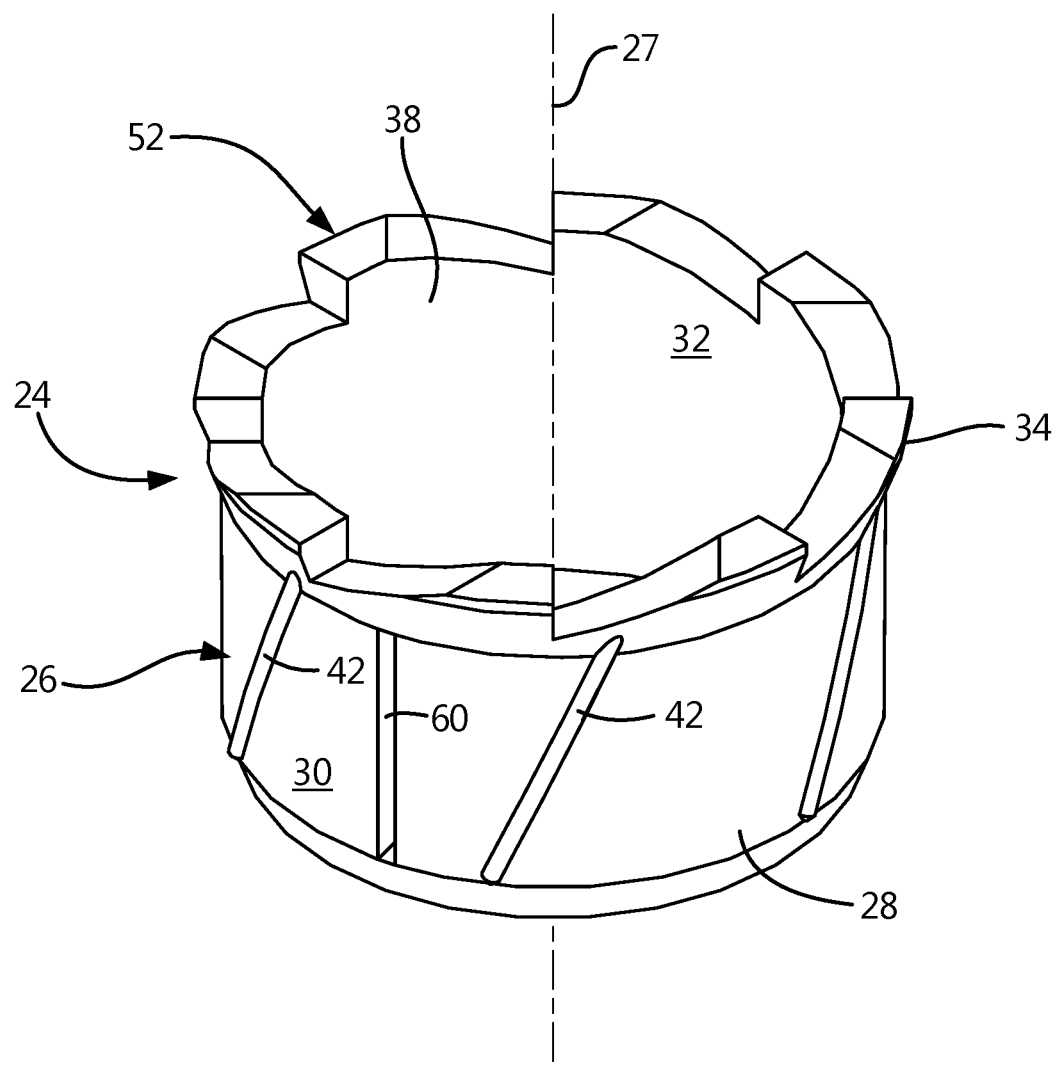
FIG. 3 is a perspective view of a centering sleeve of the present invention.
Figure 4:
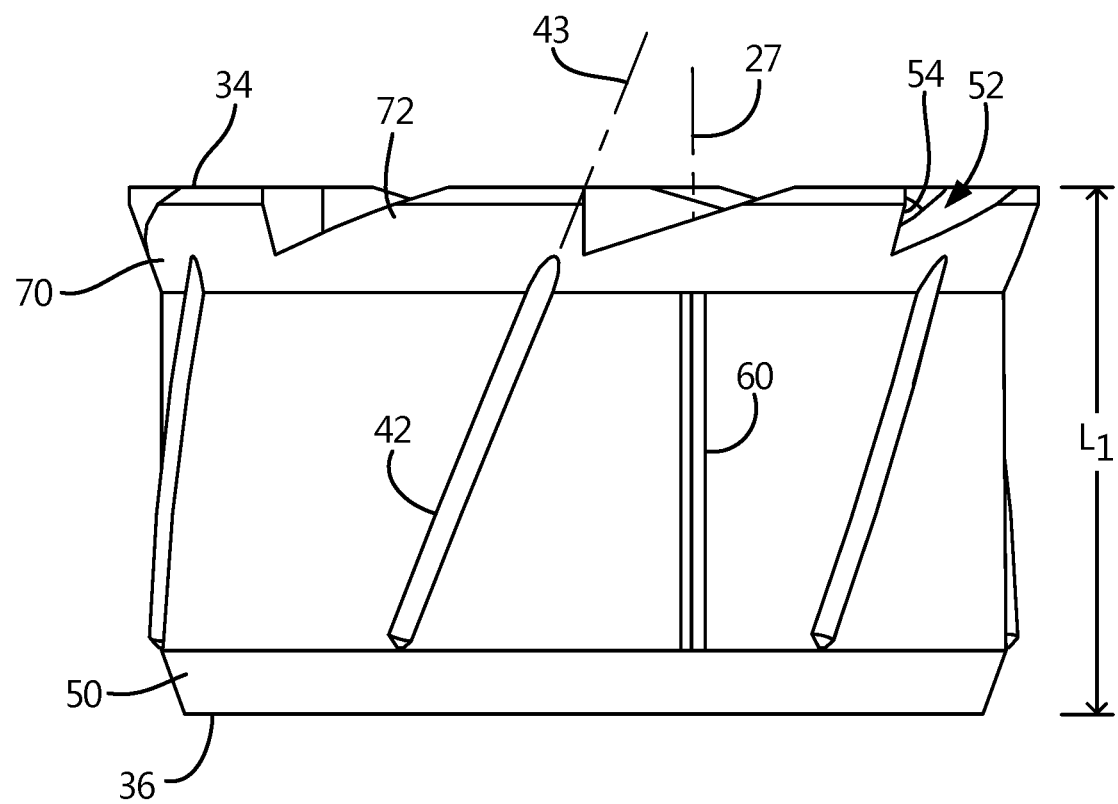
FIG. 4 is an elevational view of a centering sleeve of the present invention.
Figure 5:
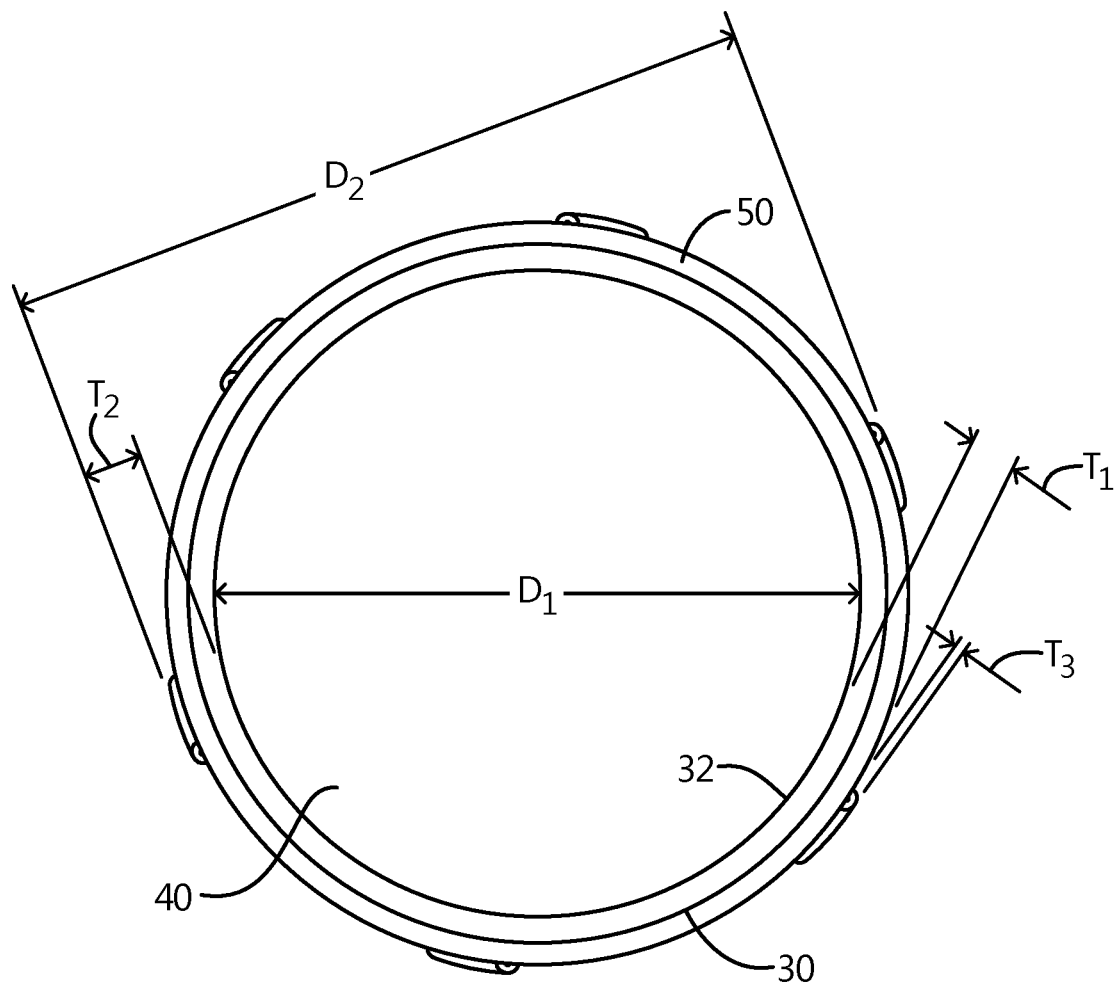
FIG. 5 is a bottom plan view of a centering sleeve of the present invention.

Wheel centering sleeve 24 is illustrated in isolation in FIGS. 3-5, wherein wheel centering sleeve 24 has a body 26 with an axis 27 and a wall 28 extending at least partially circumaxially about the axis 27. Wall 28 includes an exterior surface 30 and an interior surface 32 so as to define a first thickness "$T_1$" therebetween. First and second axial ends 34, 36 of wall 28 define an axial length "$L_1$" of body 26. In the illustrated embodiment, body 26 is tubular and substantially cylindrical, with axis 27 passing through first and second open ends 38, 40 of sleeve 24. Interior surface 32 defines an inner diameter "$D_1$" that is preferably substantially equal to, but may be slightly larger than a diameter of studs 16, so that sleeve 24 snugly fits circumaxially about a respective stud 16. Typically, interior surface 32 of wall 28 is smooth, or at least non-threaded so as to slidably engage about a respective stud 16. In other embodiments, however, interior surface 32 may be threaded to threadably engage with a respective stud 16. Typical studs have a 22 mm diameter, though such dimension can change over time due to corrosion effects with long-term exposure to the environment. It is therefore desirable to provide sleeve 24 with an inner diameter $D_1$ that is sufficiently large to fit circumaxially about stud 16, but without significant spacing between sleeve 24 and stud 16.

Though in the illustrated embodiment, wall 28 is substantially cylindrical extending circumaxially about axis 27, it is contemplated that wall 28 may comprise less than a complete cylinder, and is preferably configured to stably support wheel 12 when positioned in a respective hole 18, and particularly to fill any gap between stud 16 and wheel 12 within hole 18. The gap, however, need not be filled throughout an annular circumference, but rather is sufficiently filled to avoid relative movement between wheel 12 and stud 16.

Exterior surface 30 preferably includes one or more fins 42 extending outwardly therefrom and circumaxially spaced apart around exterior surface 30. Fins 42 define an outer diameter "$D_2$" of sleeve 24. An initial thickness "$T_2$" is therefore defined as a radial difference between outer diameter $D_2$ and inner diameter $D_1$, which is one-half of the difference between outer diameter $D_2$ and inner diameter $D_1$.

Figure 6:
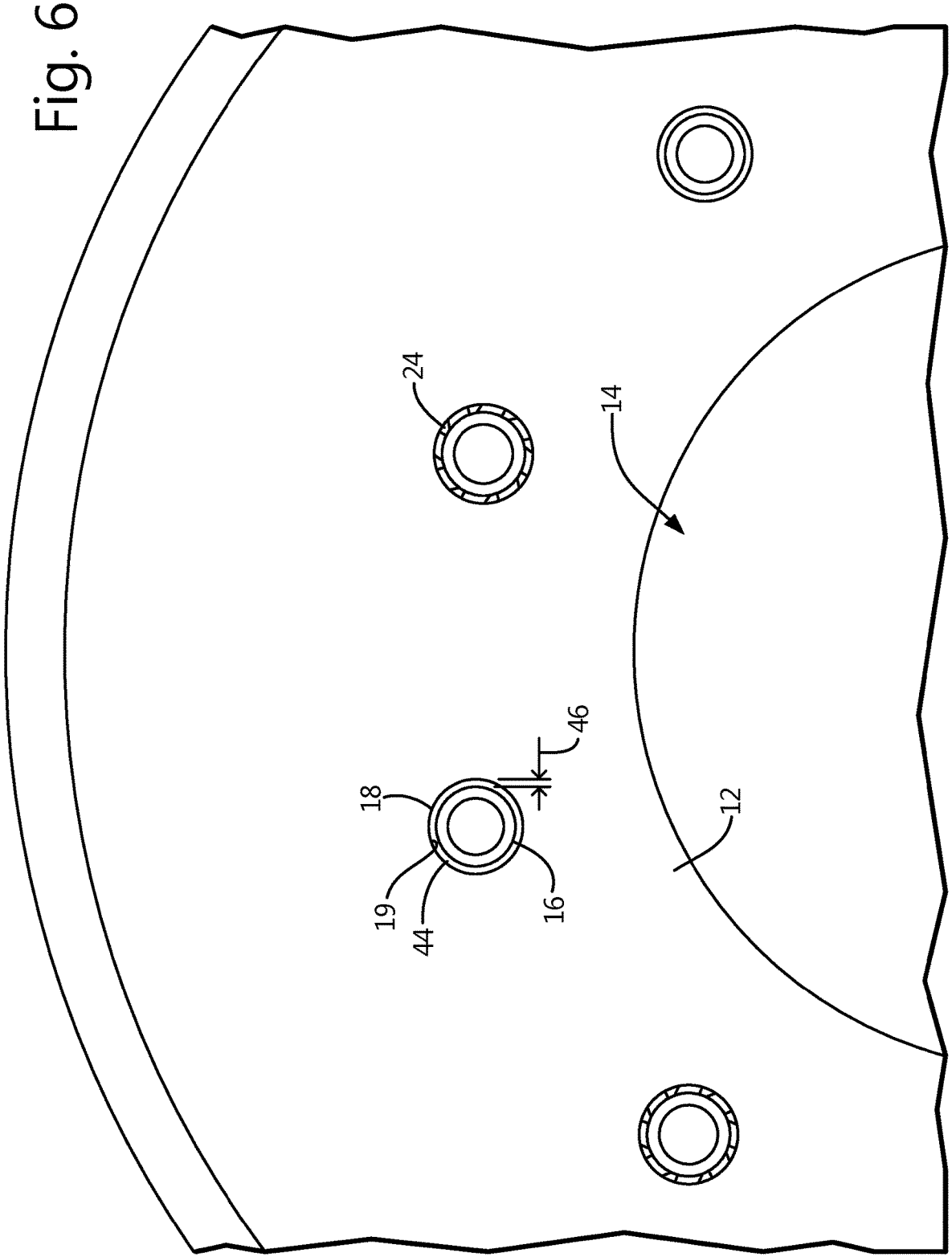
FIG. 6 is a schematic illustration of centering sleeves mounted in respective gaps between studs and a wheel.

As illustrated in FIG. 6, a gap 44 may be present between an outer surface of stud 16 and an inner surface 19 of wheel 12 defining hole 18. Gap 44 has a gap space 46 defined radially between stud 16 and inner surface 19 of wheel 12 when stud 16 is concentrically within wheel hole 18. Preferably, sleeve 24 fills gap 44 when installed between stud 16 and wheel 12 at wheel hole 18. Due to the effects of corrosion over time, as well as manufacturing tolerances, gap space 46 is somewhat unpredictable from wheel to wheel, and even from wheel hole to wheel hole. Consequently, wheel centering sleeves with a static thickness dimension may not be entirely successful in permanently centering wheel 12 at hub 14, because some gap space 46 is left between one or both of the sleeve and inner surface 19 and stud 16. Therefore, an aspect of the present invention is in a modifiable thickness dimension to account for variability in gap space 46. In order to obtain a readily modifiable thickness for wheel centering sleeve 24, it is contemplated that body 26 may preferably be fabricated from a material that is one or both of compressible and at least partially friable. In particular, at least a portion of wheel centering sleeve 24 may be compressible upon instillation into gap space 46, wherein an initial, pre-instillation thickness of wheel centering sleeve 24 is greater than its thickness upon instillation into gap 44.

For the purposes hereof, the term "compressible" is intended to mean the ability of a material to be reduced in volume by application of pressure, which, quantitatively, is the reciprocal of the bulk modulus of the material. While many materials may be considered "compressible" to an extent, wheel centering sleeve 24 may be more compressible, at least along a radial direction, than the compressibility of wheel 12, or at least a portion thereof adjacent to holes 18. Typically, wheel 12 is fabricated from a metal such as steel, aluminum, or alloy materials. In some embodiments, at least portions of wheel centering sleeve 24 may be fabricated from one or more plastic materials, composites, ceramics, or the like. One example composite material contemplated for use in the fabrication of wheel centering sleeve 24 is a polyamide with fiberglass filler. It is also contemplated that the compositional makeup of wheel centering sleeve 24 may be consistent throughout the structure, or may instead be heterogeneous with certain portions exhibiting materials and/or properties that are distinct from other portions of the structure. Materials exhibiting compressibility greater than that of wheel 12, and particularly around holes 18, may be useful in the fabrication of wheel centering sleeve 24. Such materials may also preferably be resistant to corrosion, and particularly at least resistant to corrosion caused by exposure to moisture.

In some embodiments, at least fins 42 may be compressible to be reduced in volume when wheel centering sleeve 24 is installed in gap 44. The entirety of body 26 may also be compressible to an extent sufficient to permit installation of wheel centering sleeve 24 into gap 44. The compressibility of at least a portion of wheel centering sleeve 24 aids in ensuring a tight fit between surface 19 of wheel 12 at hole 18 and stud 16. Such a tight fit reduces or eliminates the likelihood of wheel clocking about hub 14. The compressibility of at least a portion of wheel centering sleeve 24 permits the initial thickness $T_2$ to be equal to or larger than gap space 46 of gap 44, wherein installation of wheel centering sleeve 24 into gap 44 results in the reduction in thickness of wheel centering sleeve 24 from initial thickness $T_2$. In some embodiments, therefore, initial thickness $T_2$ may be substantially equal to or greater than gap space 46. In some embodiments, therefore, wheel centering sleeve 24 may be considered to be conformable to gap 44. In some embodiments, at least a portion of wheel centering sleeve 24 may be fabricated from a material that exhibits resilience, which, for the purposes hereof, may mean the ability of a strained body, by virtue of high yield strength and low elastic modulus, to recover its size and form following deformation.

At least a portion of wheel centering sleeve 24 may be friable, and preferably more friable than wheel 12 at or adjacent to hole 18. For the purposes hereof, the term "friable" shall mean be a material capable of being easily broken into smaller pieces under duress or contact, especially by rubbing. Fins 42 may be more friable than wheel 12, such that installation of wheel centering sleeve 24 into gap 44 may result in at least partial removal of fins 42 from body 26. In addition to, or instead of a compressibility characteristic, wheel centering sleeve 24 may be at least partially friable to permit a grinding, shearing, or breaking off of portions of sleeve 24, such as portions of fins 42 during the installation process. For example, pressure applied to wheel centering sleeve 24 upon installation into gap 44 may grind down some or all of a thickness dimension "$T_3$," of fins 42, measured radially from exterior surface 30. Such friability of at least fins 42 permits a modifiable thickness to wheel centering sleeve 24, and, therefore, a customized and tight fit in gap 44. Materials contemplated for the fabrication of wheel centering sleeve 24 may be one or both of more friable than wheel 12 and more compressible than wheel 12, at least at portions of wheel 12 surrounding holes 18. It is to be understood that the compressibility and friability of wheel 12 is considered to be that portion of wheel 12 which is in a non-corroded state. For example, corroded surfaces and portions of wheel 12 may be highly friable, which is a core source of variability in the dimension of gap space 46. Thus, while corroded surfaces and portions of wheel 12 may, in fact, be more friable and/or compressible than wheel centering sleeve 24, installation of wheel centering sleeve 24 into gap 44 preferably entails contact between wheel centering sleeve 24 and a portion of wheel 12 that is less compressible and/or less friable than wheel centering sleeve 24.

In some embodiments, fins 42 may be arranged at exterior surface 30 to be skew with respect to axis 27, with such skewed relationship being illustrated in FIGS. 3 and 4, wherein a fin axis 43 is non-parallel to central axis 27. Arrangement of fins 42 may be skewed in an orientation to facilitate rotatable installation of wheel centering sleeve 24 into gap 44. In this manner, fins 42 may act as "threads" to aid in a rotational component of installation of supply to wheel centering sleeve 24.

Installation of wheel centering sleeve 24 into gap 44 may be facilitated by a chamfered portion 50 of wall 28. Chamfered portion 50 is illustrated in FIG. 4 adjacent to second axial end 36 of wheel centering sleeve 24, with such second axial end 36 typically being the leading edge of wheel centering sleeve 24 driven into gap 44.

First axial end 34 may include a tool mating surface 52 having one or more features 54 that are specifically configured for engagement with a tool 82 for rotating body 26 about axis 27. In the illustrated embodiment, features 54 may be recesses or cutouts in first axial end 34 that are configured for engagement with head 84 of tool 82 for rotation of body 26 in a rotational direction that may be aided by the skewed orientation of fins 42. In most cases, wheel studs are threaded with a "right-hand" configuration, wherein clockwise rotation of a nut onto a stud 16 actually draws the nut onto the stud for tightening wheel 12 about hub 14. Consistent with such stud threading, fins 42 may be skewed in a "right-hand" orientation so as to cooperate with tool mating surface 52 in transmitting rotational force applied to body 26 from tool 82 to the installation of wheel centering sleeve 24 into gap 44. Various designs and arrangements for tool mating surface 52, however, are contemplated by the present invention. FIGS. 9-12 and 21-24 illustrate wheel centering sleeve 24 being driven alternatively by tool 82 or a stud nut 76 into gap 44.

Figure 7:
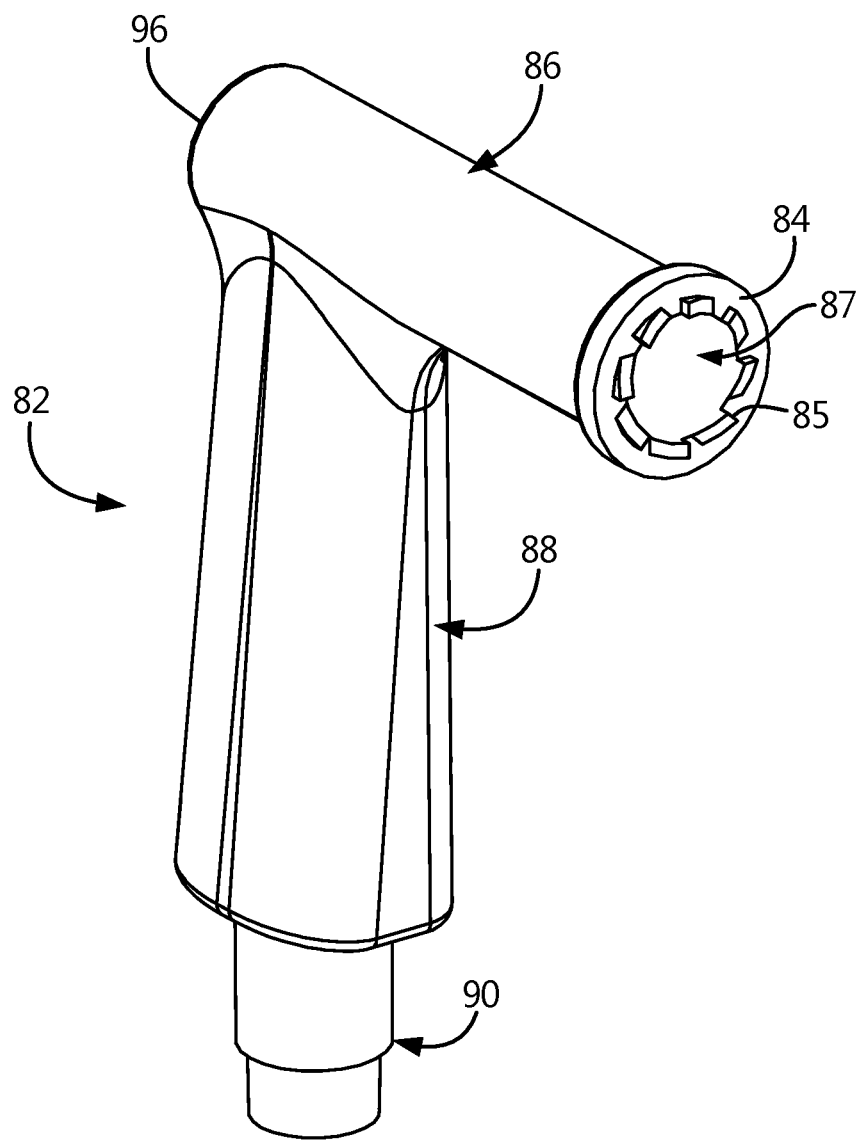
FIG. 7 is a perspective view of a mounting tool of the present invention.
Figure 8:
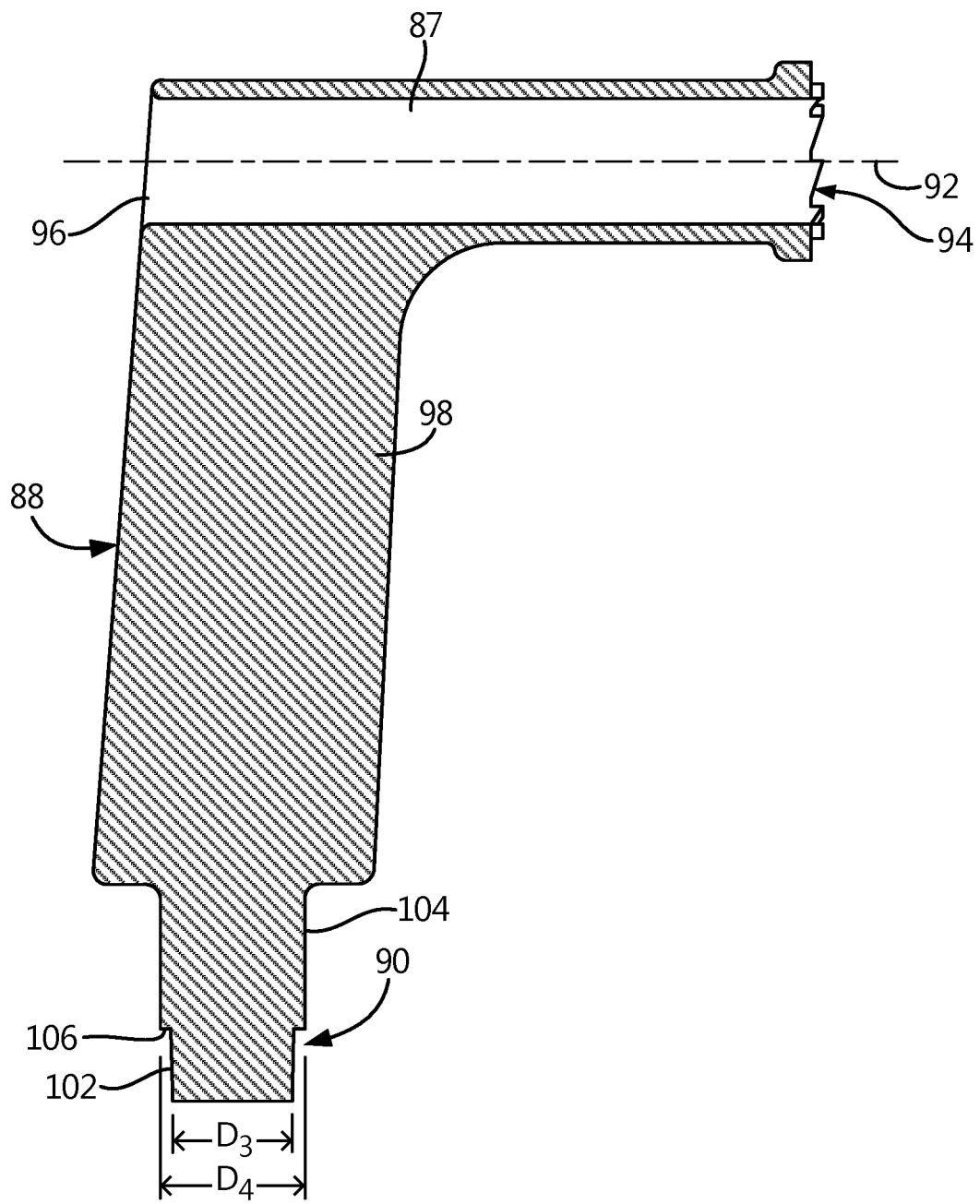
FIG. 8 is a cross-sectional elevational view of a mounting tool of the present invention.
Figure 9:
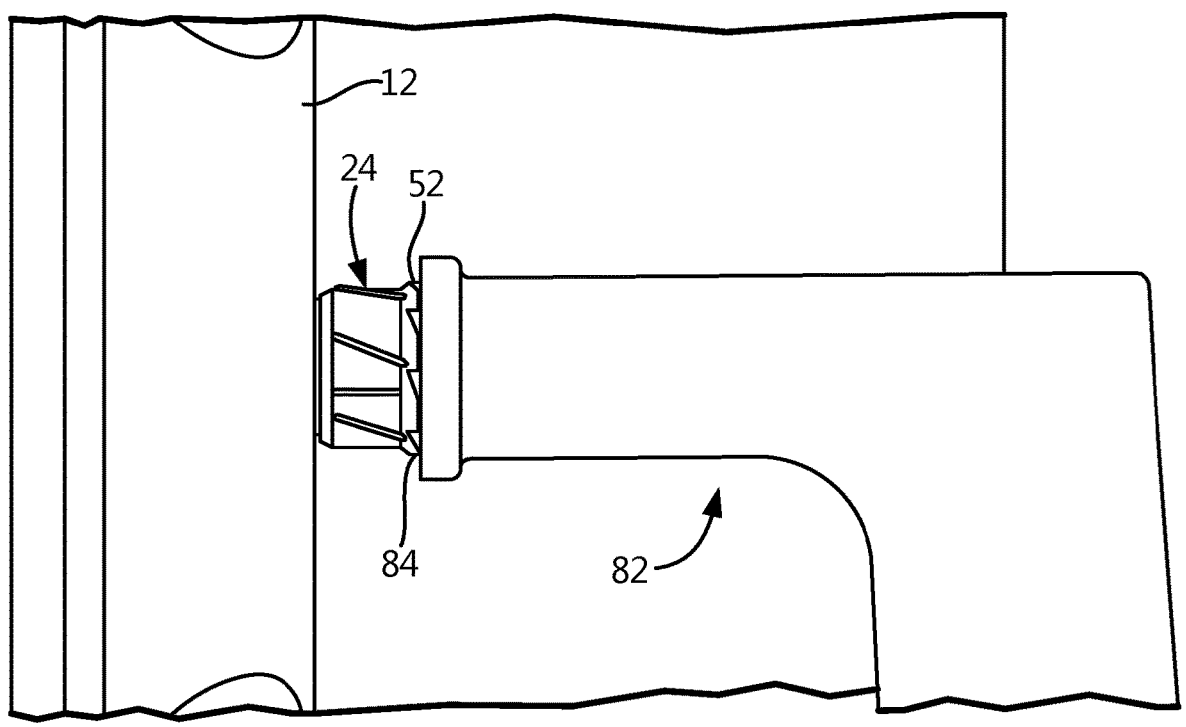
FIG. 9 is a schematic side elevational view illustration of a mounting tool in operation to install a centering sleeve of the present invention.
Figure 10:
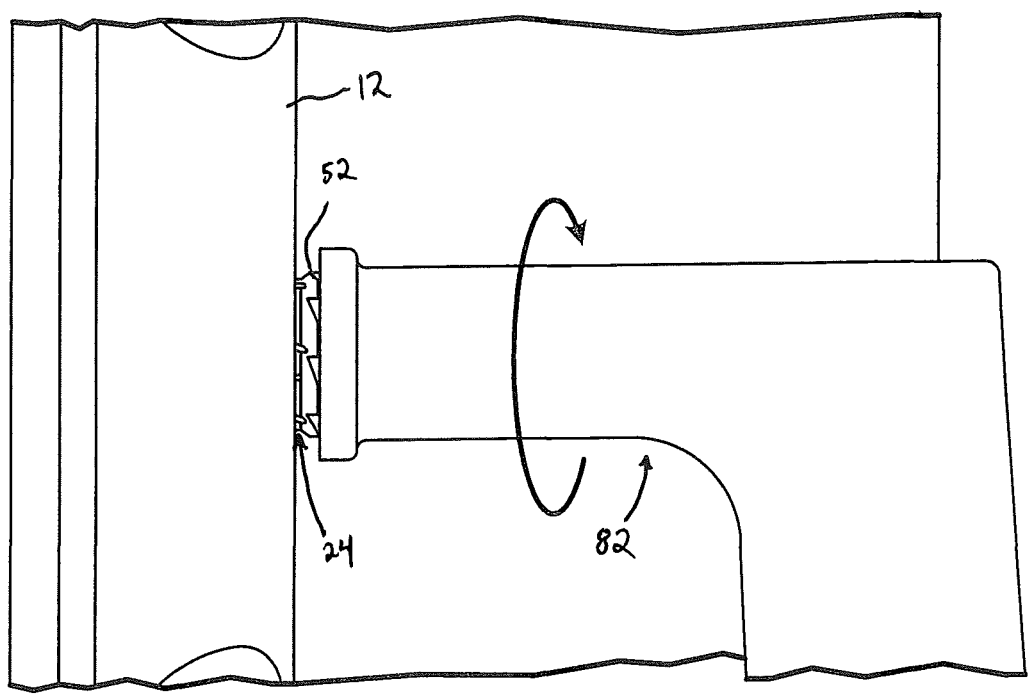
FIG. 10 is a schematic side elevational view illustration of a mounting tool in operation to install a centering sleeve of the present invention.
Figure 11:
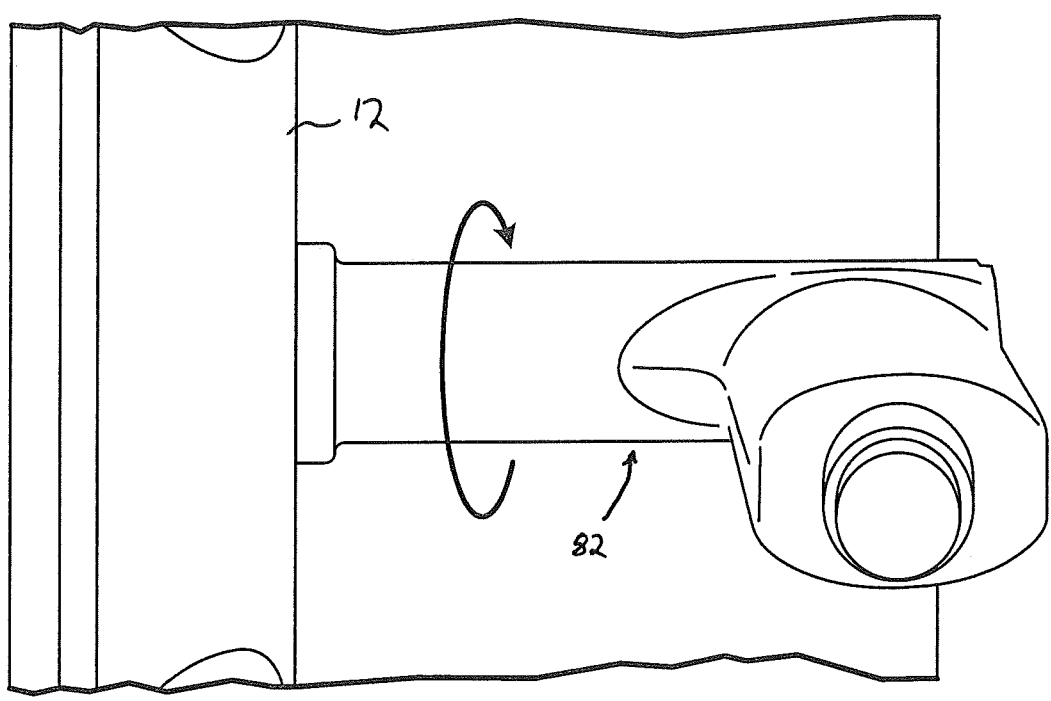
FIG. 11 is a schematic side elevational view illustration of a mounting tool in operation to install a centering sleeve of the present invention.
Figure 12:
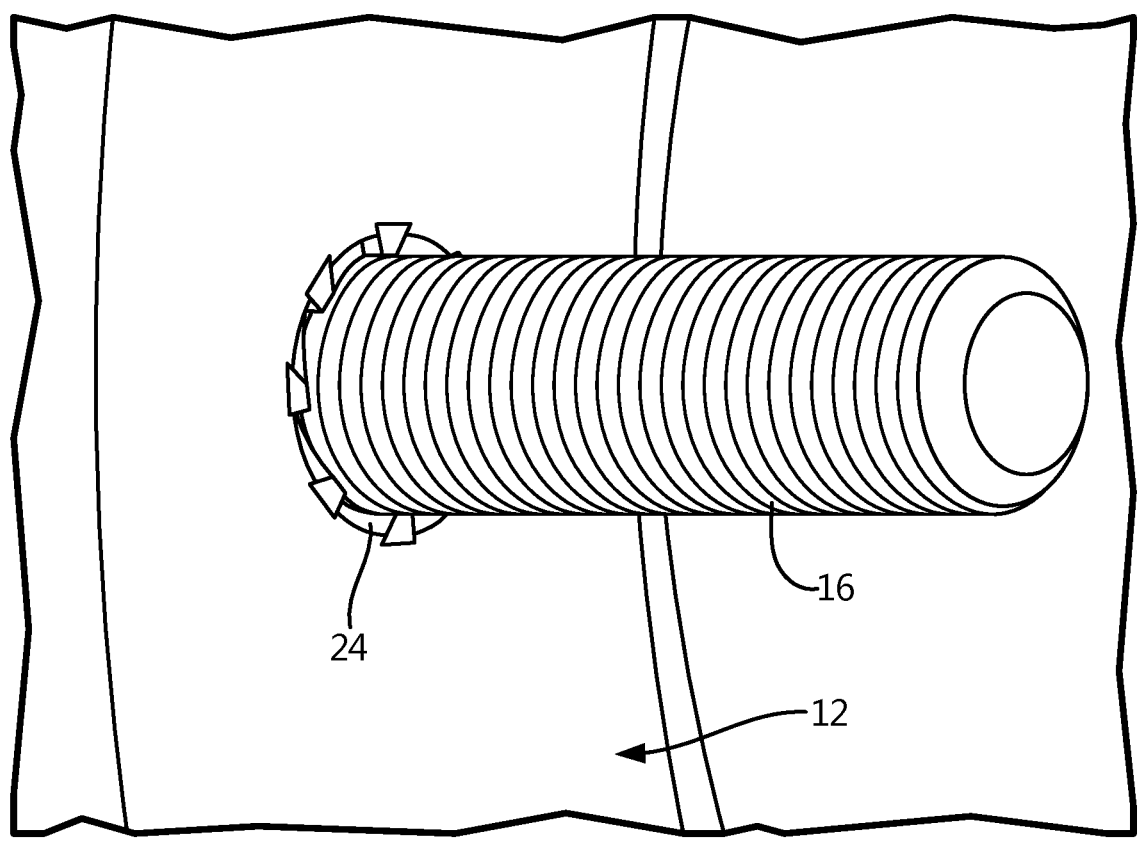
FIG. 12 is an illustration of a centering sleeve of the present invention installed in a gap between a stud and a wheel.

Tool 82, as shown more clearly in FIGS. 7 and 8, includes a first portion 86 with head 84 configured for mating engagement with tool mating surface 52, and a second portion 88 having a key 90 configured for engagement with second axial end 36 to aid in detaching wheel centering sleeve 24 from wheel 12 when wheel 12 is disassembled from hub 14. Preferably, key 90 of tool 82 may be employed to "knock out" wheel centering sleeve 24 from within hole 18 of wheel 12 by applying force to second axial end 36.

Head 84 of tool 82 includes features 85, such as teeth, that are operably engageable with tool mating surface 52 of wheel centering sleeve 24. It is to be understood, however, that features 85 may be of any suitable configuration for operable engagement with tool mating surface 52. In some embodiments, features 85 enable an engagement with wheel centering sleeve 24, wherein rotation of tool 82 about tool rotation axis 92 may impart a corresponding rotation to the engaged wheel centering sleeve 24. In some embodiments, a combination of rotation about, and a pushing force applied along tool rotation axis 92 is effective in installing wheel centering sleeve 24 into gap 44. In some embodiments, installation of wheel centering sleeve 24 into gap 44 may be accomplished without rotation of wheel centering sleeve 24 about axis 27. In such cases, tool 82 may simply be pushed along tool rotation axis 92 so that head 84 applies a pushing installation force against first axial end 34 of wheel centering sleeve 24.

First portion 86 of tool 82 may be substantially hollow forming a channel 87 to receive a respective stud 16 therein, or therethrough, when operating to engage or engaging wheel centering sleeve 24 at a position about such stud 16. In this manner, first portion 86 may include first and second open ends 94, 96 that communicate with channel 87 through first portion 86 of tool 82.

Second portion 88 of tool 82 may comprise a handle portion 98 that is secured to, or integrally formed with first portion 86. Second portion 88 preferably further includes key 90 that is configured for engagement with second axial end 36 of wheel centering sleeve 24 to aid in detaching wheel centering sleeve 24 from wheel 12 after wheel 12 has been disassembled from hub 14. While key 90 may assume a variety of configurations, the illustrated embodiment includes an insert portion 102 and a brace portion 104, with insert portion 102 extending coaxially from brace portion 104 to define an annular bearing surface 106 of brace portion 104. Insert portion 102 preferably has an insert portion diameter "$D_3$" that is substantially equal to, but slightly smaller than inner diameter $D_1$ of wheel centering sleeve 24. In this manner, insert portion 102 may be inserted within the space defined by circumaxial wall 28 of wheel centering sleeve 24. Brace portion 104 may exhibit a brace diameter "$D_4$" substantially equal to a confined outer diameter $D_2$ of wheel centering sleeve 24. Accordingly, bearing surface 106 may be engaged against second axial end 36 of body 26 so as to apply force along first axis 27 to push wheel centering sleeve 24 out from hole 18. The need for removing wheel centering sleeve from hole 18 with second portion 88 may typically arise in the event that wheel centering sleeve 24 becomes stuck in a respective hole 18, even after removal of wheel 12 from wheel studs 16. In the illustrated embodiment, brace portion diameter $D_4$ may preferably be slightly less than the diameter of the corresponding stud hole 18 in wheel 12.

Example operations for tool 82 with respect to wheel centering sleeve 24 are shown in the drawings. For example, wheel centering sleeve 24 may be installed into gap 44 with tool 82, as shown in FIGS. 9-12. Engagement between head 84 of tool 82 and tool mating surface 52 of wheel centering sleeve 24 acts to push wheel centering sleeve 24 along axis 27 into gap 44, and optionally rotate about axis 27, as driven by the manipulation of tool 82. The progression of installation of wheel centering sleeve 24 into gap 44 of wheel 12 is illustrated in FIGS. 9-12, with tool 82 removed from about stud 16 in FIG. 12.

Figure 13:
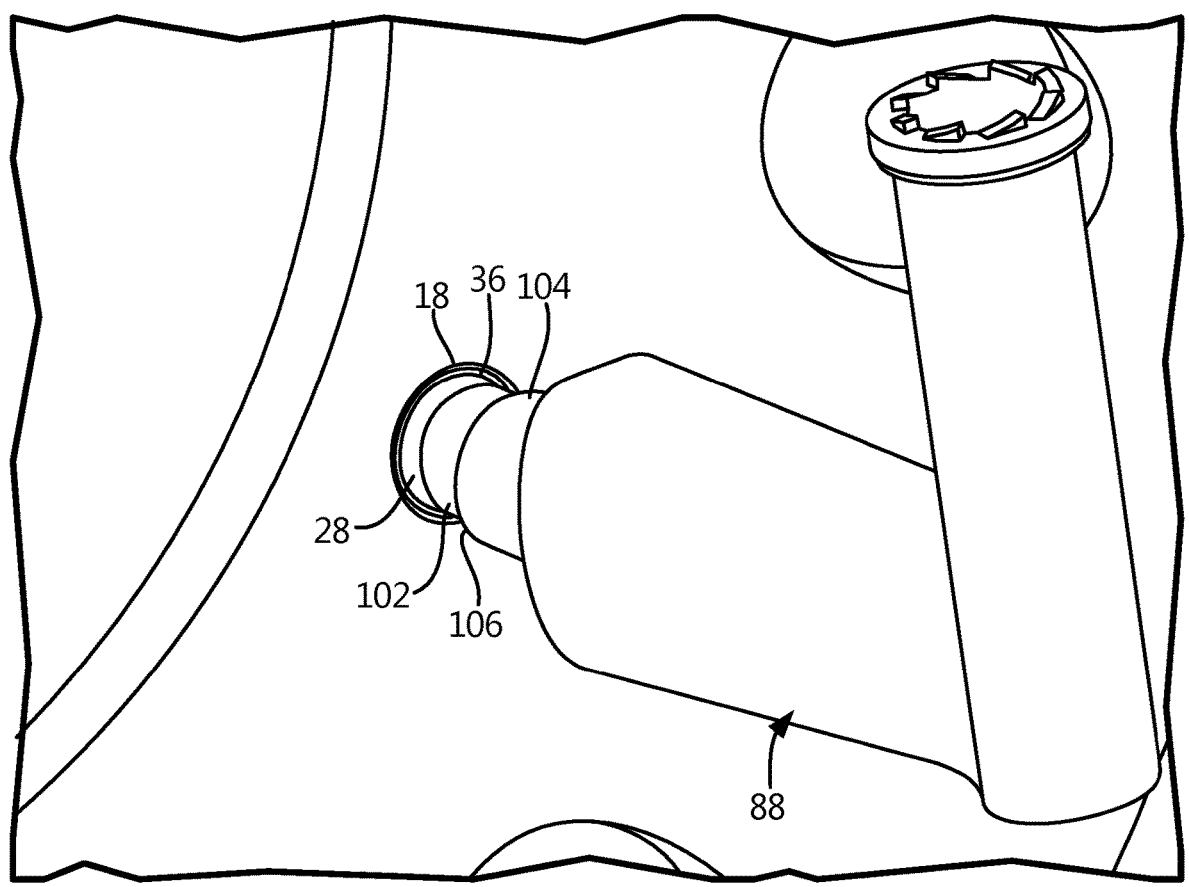
FIG. 13 is a schematic illustration of a tool in operation to detach a centering sleeve from a component.
Figure 14:
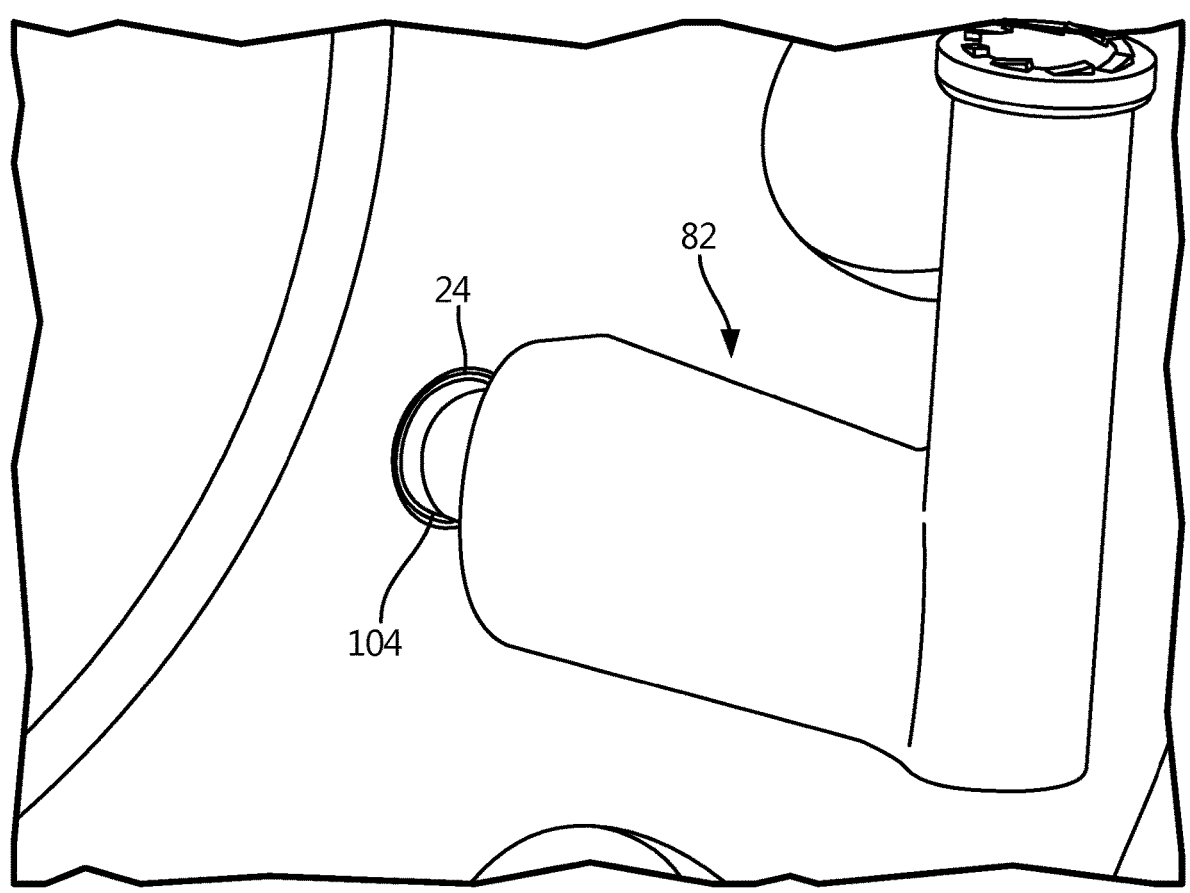
FIG. 14 is a schematic illustration of a tool in operation to detach a centering sleeve of the present invention from a component.
Figure 15:
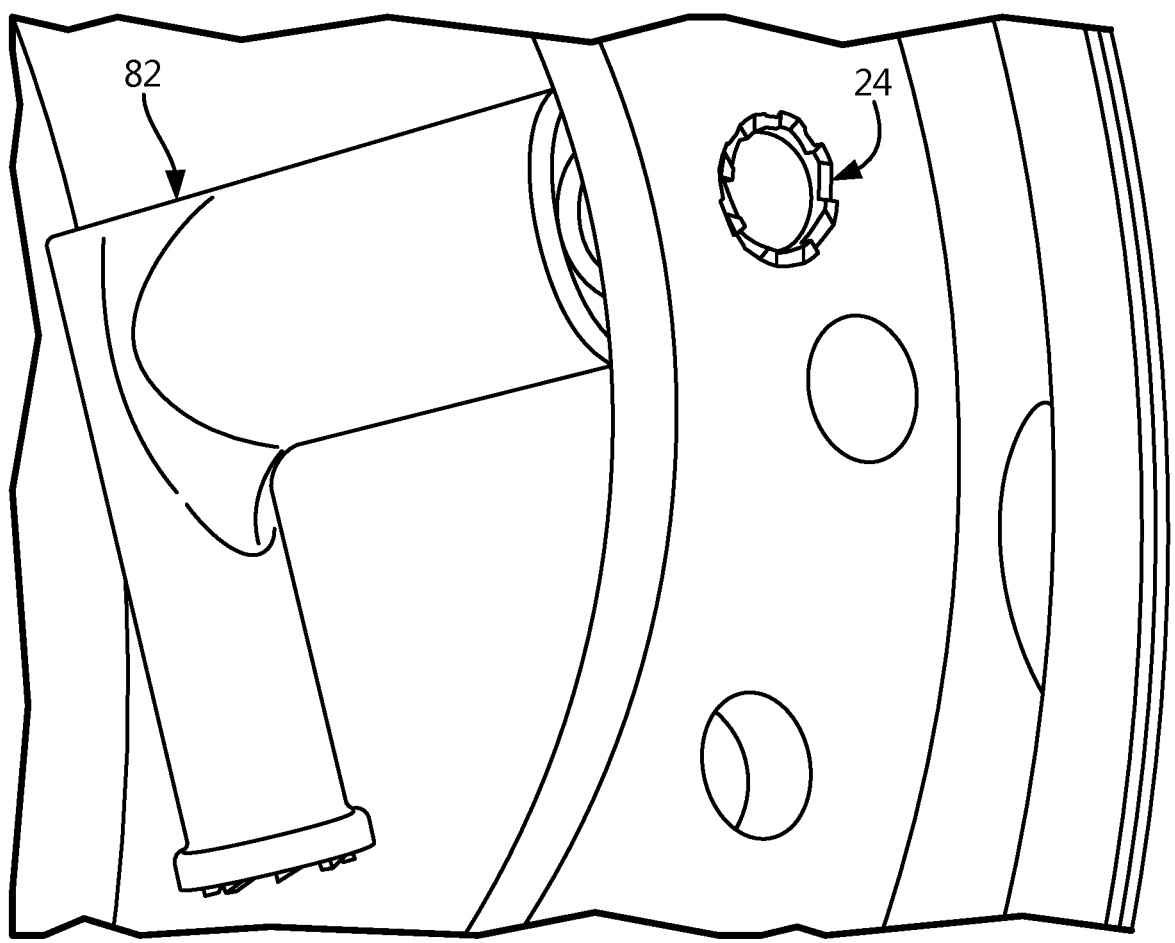
FIG. 15 is a schematic illustration of a tool in operation to detach a centering sleeve of the present invention from a component.
Figure 16:
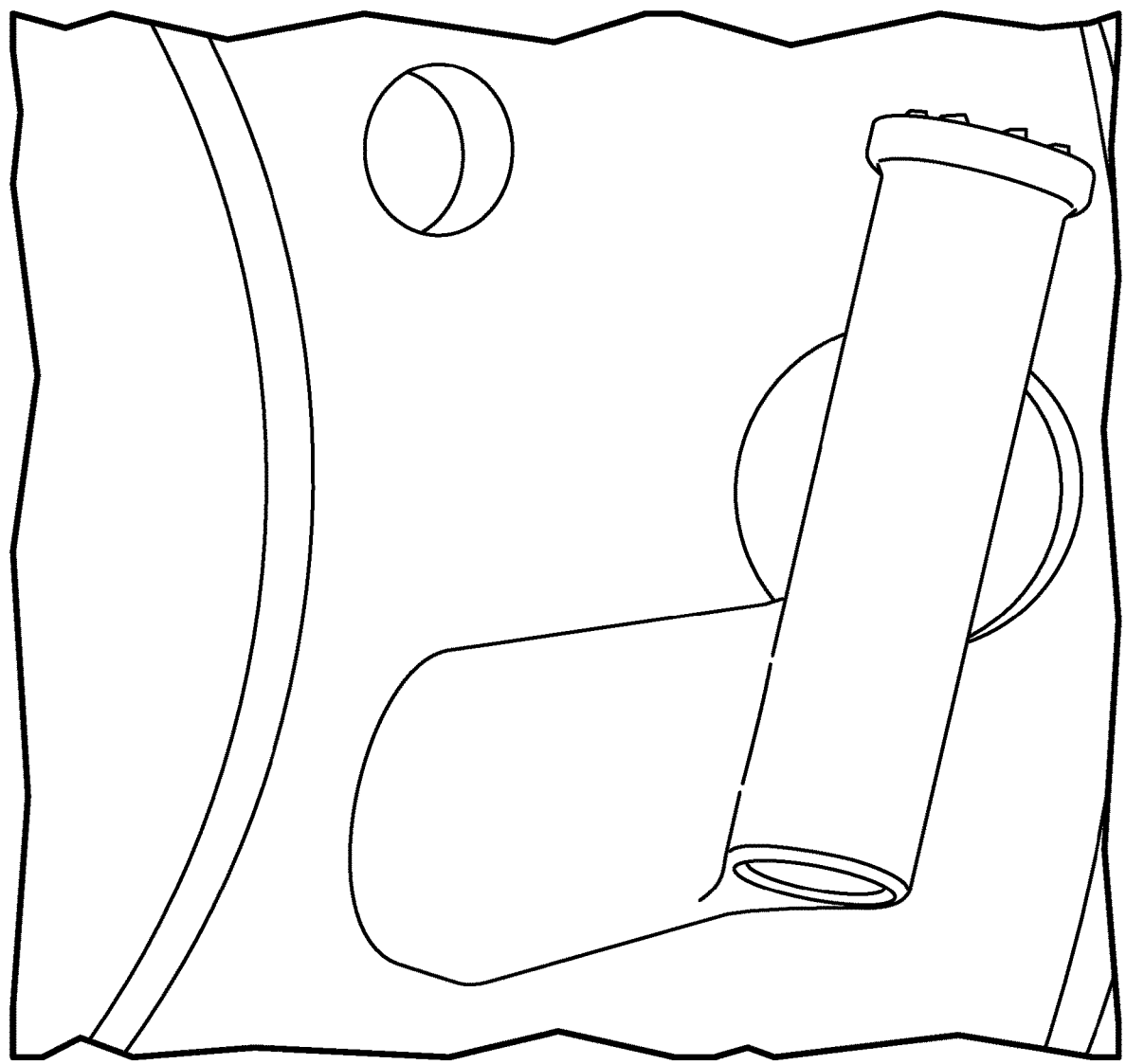
FIG. 16 is a schematic illustration of a tool in operation to detach a centering sleeve of the present invention from a component.
Figure 17:
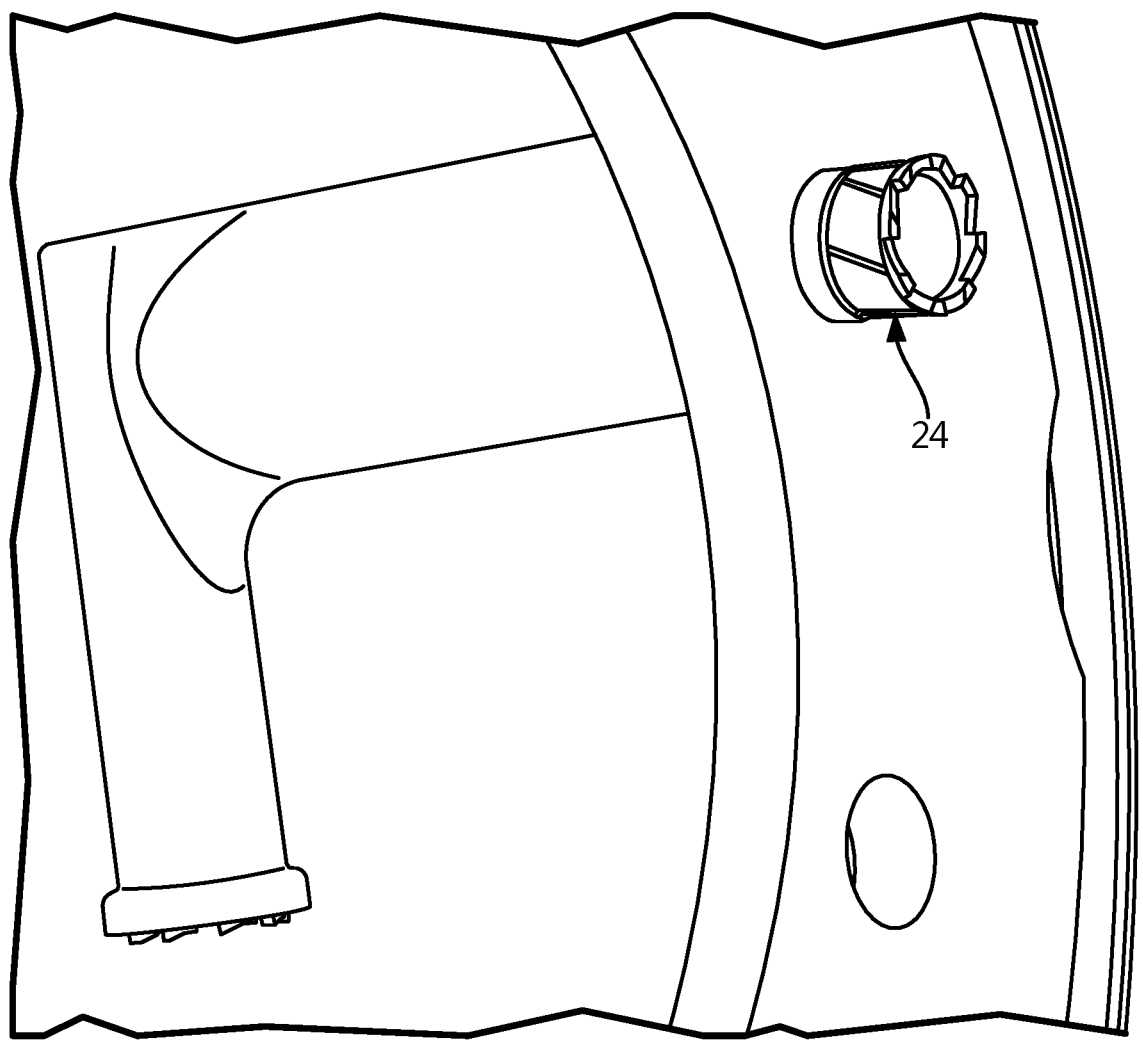
FIG. 17 is a schematic illustration of a tool in operation to detach a centering sleeve of the present invention from a component.

The present invention contemplates methods for removal of wheel centering sleeve 24 from a respective stud 16, or from within hole 18 of wheel 12. In some embodiments, tool 82 may be employed to remove wheel centering sleeve 24 from hole 18 of wheel 12. An example approach for utilizing tool 82 for the removal of wheel centering sleeve 24 is illustrated in FIGS. 13-17, with FIG. 13 illustrating a first step in positioning insertion portion 102 into a space defined within circumaxial wall 28 of wheel centering sleeve 24, which space was previously occupied by a respective stud 16 from hub 14. As shown in FIGS. 14 and 15, tool 82 is advanced along axis 27 so that insert portion 102 fits within wheel centering sleeve 24, and with bearing surface 106 in contact with second axial end 36. FIG. 15 is a rear view of the engagement between tool 82 and wheel centering sleeve 24 at second axial end 36. FIGS. 16 and 17 illustrate the further advancement of tool 82 into and through hole 18 along axis 27 to displace wheel centering sleeve 24 out from hole 18. FIG. 17 is a rear view of the condition illustrated in FIG. 16, with brace section 104 pushed by the manipulation of tool 82 into hole 18. Such manipulation forces wheel centering sleeve 24 out from hole 18, as shown in FIG. 17.

Figure 18:
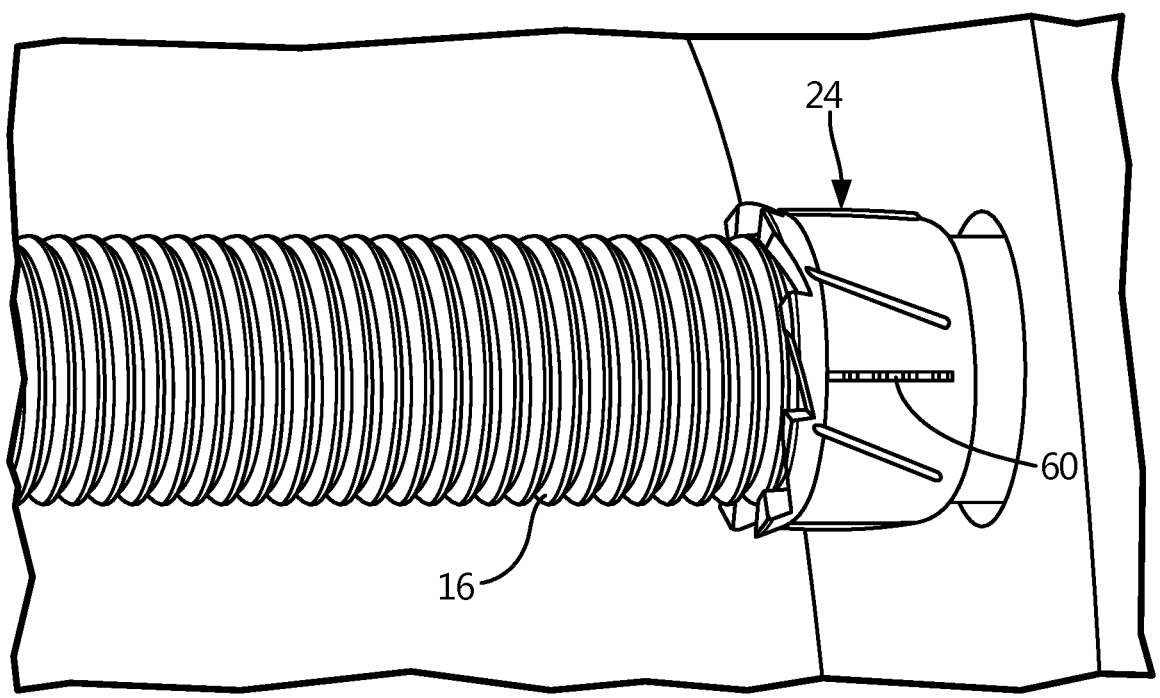
FIG. 18 is a schematic illustration of a centering sleeve of the present invention mounted at a stud of a vehicle hub.
Figure 19:
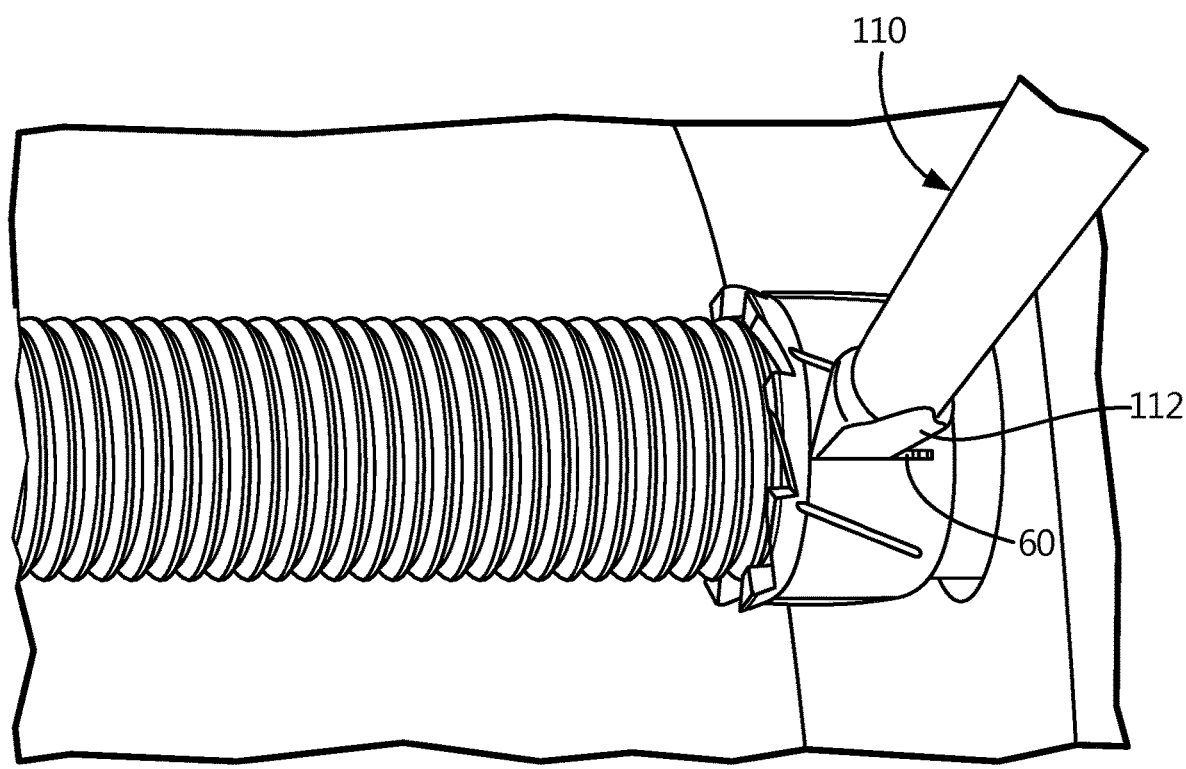
FIG. 19 is a schematic illustration of a tool in operation remove the centering sleeve of the present invention from a stud.
Figure 20:
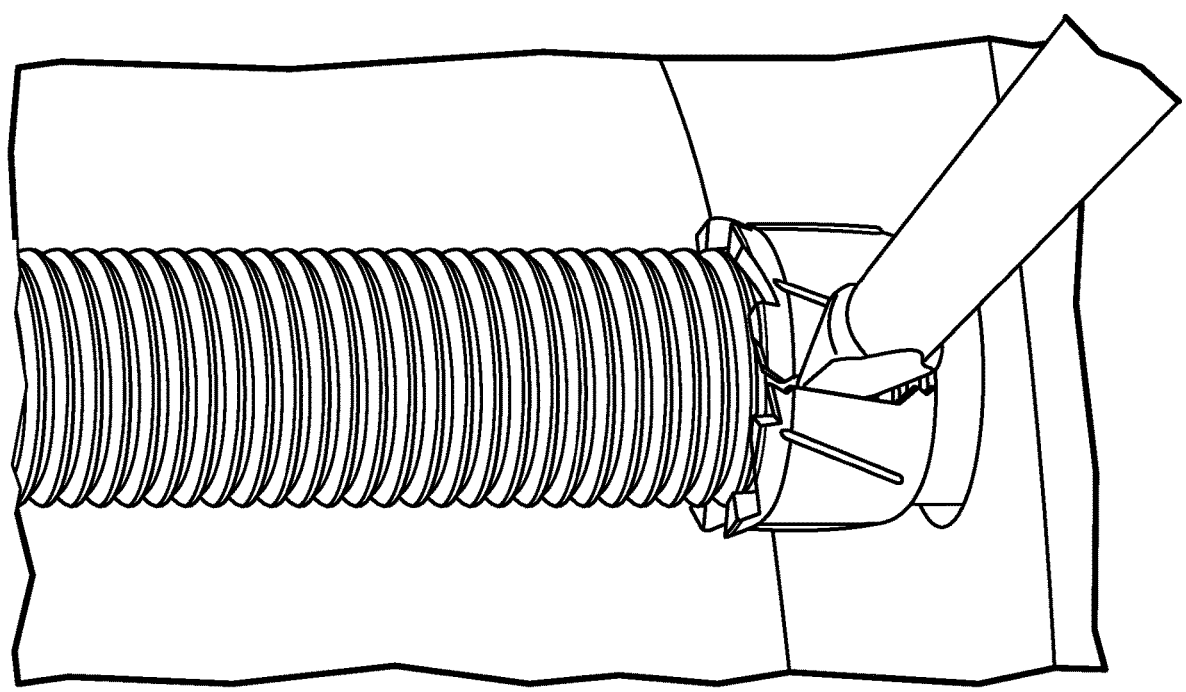
FIG. 20 is a schematic illustration of a tool in operation to remove a centering sleeve of the present invention from a stud.
Figure 21:
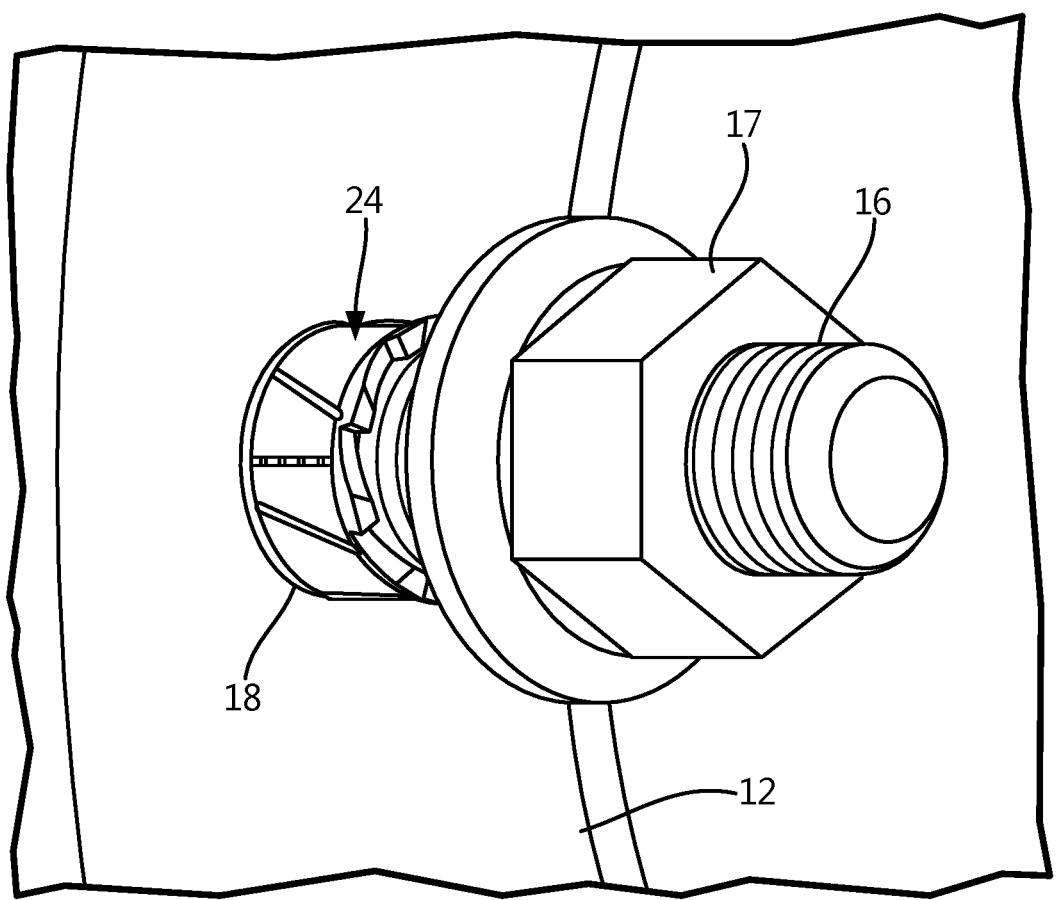
FIG. 21 is a schematic illustration of coordination between a stud nut and a centering sleeve of the present invention for installing the centering sleeve into a gap between a stud and a component.
Figure 22:
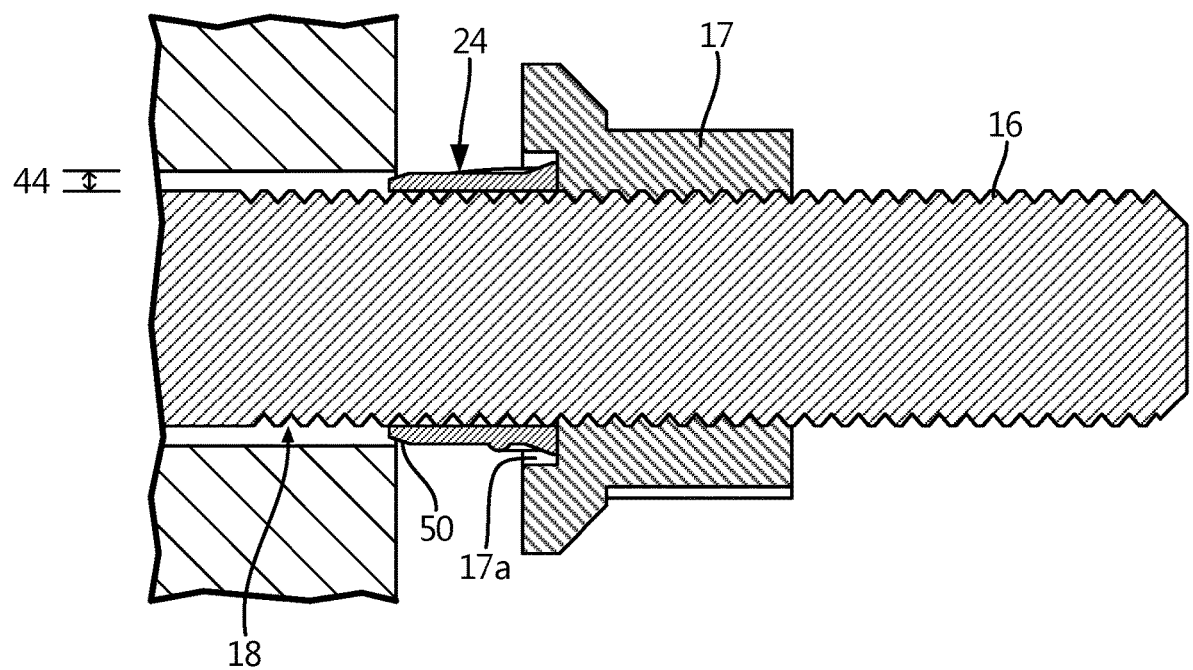
FIG. 22 is a schematic illustration of a stud nut in coordination with a centering sleeve of the present invention to install the centering sleeve into a gap between a stud and a component.
Figure 23:
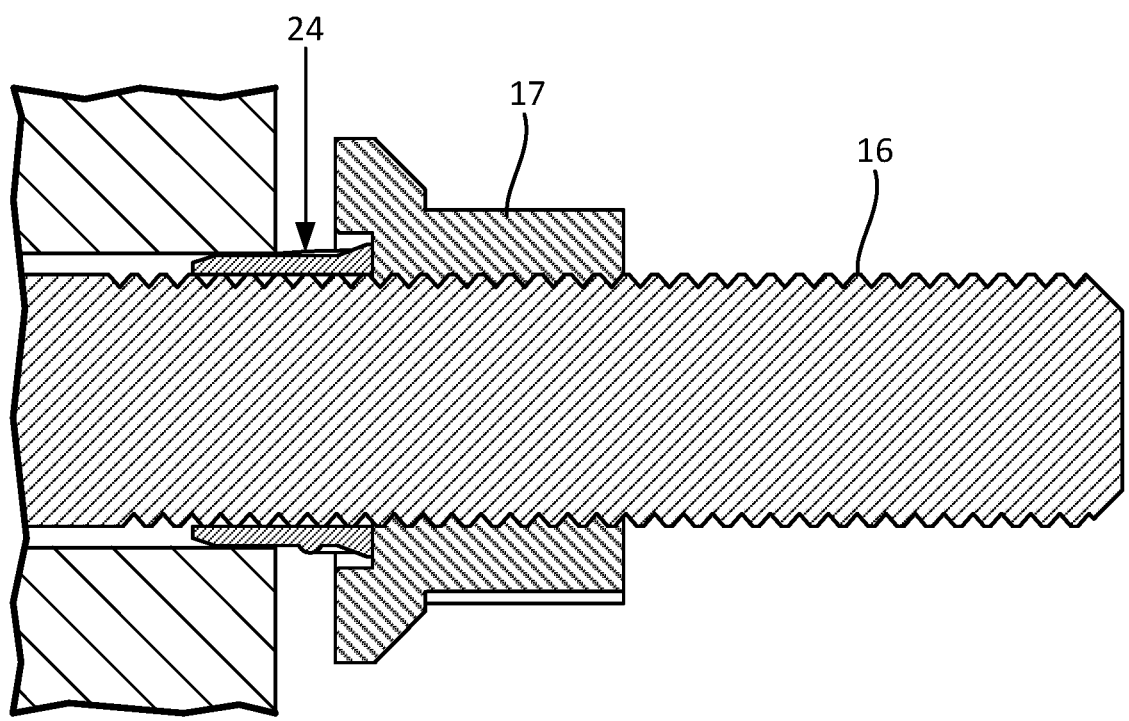
FIG. 23 is a schematic illustration of a stud nut in coordination with a centering sleeve of the present invention to install the centering sleeve into a gap between a stud and a component.
Figure 24:
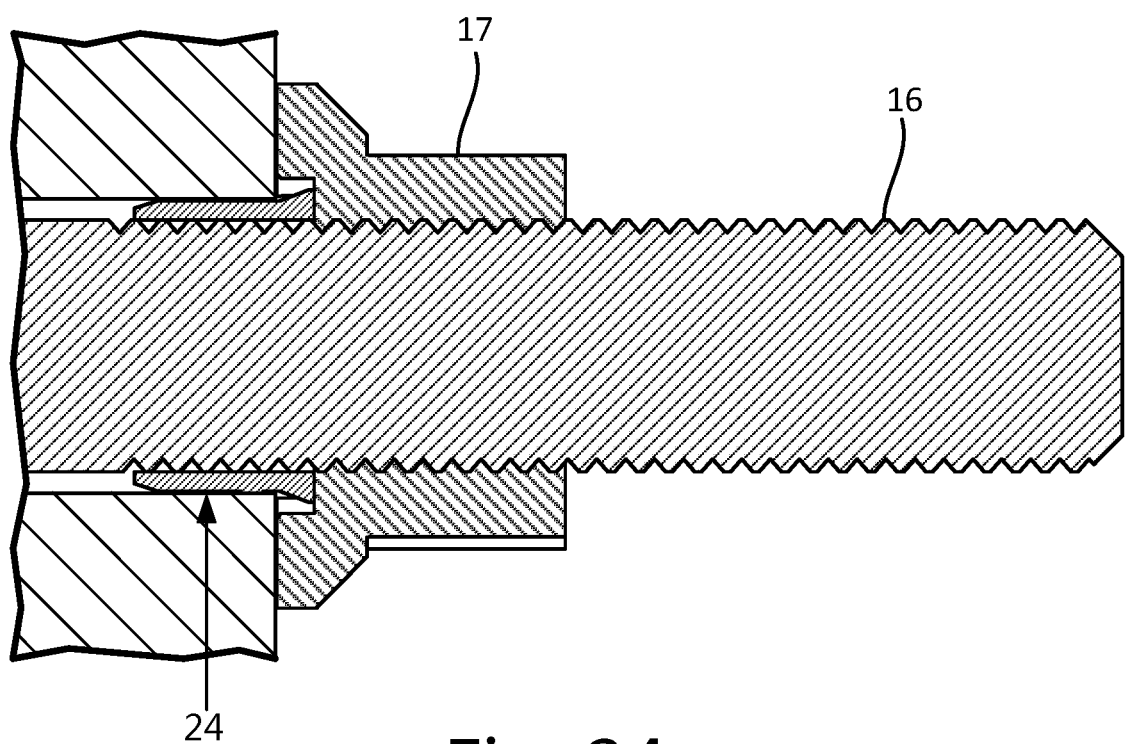
FIG. 24 is a schematic illustration of a stud nut and coordination with a centering sleeve of the present invention to install the centering sleeve into a gap between a stud and a component.

A method for removal of wheel centering sleeve 24 from engagement with stud 16 is illustrated in FIGS. 18-20, which utilizes an aperture 60 in wheel centering sleeve 24 to aid in the removal. As best illustrated in FIG. 4, aperture 60 may be included in wall 28 extending through thickness $T_1$ between exterior surface 30 and interior surface 32. Aperture 60 may assume a variety of configurations, and is illustrated as an elongated slot. In some embodiments, aperture 60 may be contained by wall 28, wherein aperture 60 does not extend completely to either of first or second axial ends 34, 36 of body 26. Aperture 60 is preferably provided as an access point for a removal tool 110, which may be manipulated as shown in FIGS. 19-20 to enlarge inner diameter $D_1$ of wheel centering sleeve 24 to assist in removing wheel centering sleeve 24 from a respective stud 16.

One drawback of conventional centering sleeves is the likelihood that such sleeves corrode with the inevitable exposure to moisture and corrosive substances, such as salts and chemicals used in roadway treatments. Conventional centering sleeves may be particularly susceptible to corrosion due to their ferrous-based materials. Currently, removal of conventional wheel centering sleeves often requires the use of torches to heat and/or cut the sleeves from engagement with one or both of the stud or wheel. Corrosion of the sleeve, stud, and wheel add to the difficulty of removal. The corrosion-resistant wheel centering sleeves of the present invention facilitate removal when needed. However, aperture 60 can further aid in removing wheel centering sleeves 24 from engagement about respective stud 16. As shown in FIGS. 19-20, an engagement portion 112 of removal tool 110 may be inserted into aperture 60 and manipulated to enlarge inner diameter $D_1$, or, in some cases, to break tubular wall 28. Such manipulation may include physical prying of the tool against wall 28 to expand inner diameter $D_1$ to an extent sufficient to enable removal of wheel centering sleeve 24 from stud 16 by axially displacing sleeve 24 with respect to the stud 16. An example removal tool 110 may be a standard "blade" screwdriver.

In some embodiments, wheel centering sleeve 24 may include a crowned portion 70 having a ramped surface 72 coincident with exterior surface 30. Ramped surface 72 may aid in the fitment of wheel centering sleeve 24 at hole 18 by at least partially driving into hole 18 during installation of wheel centering sleeve 24 into gap 44.

Installation of wheel centering sleeve 24 through the use of a stud nut is illustrated in FIGS. 21-24, wherein stud nut 17 may be threaded upon stud 16 to drive wheel centering sleeve 24 into gap 44 between stud 16 and wheel 12. Chamfered portion 15 may aid in centering wheel centering sleeve 24 in hole 18 as stud nut 17 is threaded upon stud 16 to force wheel centering sleeve 24 into hole 18. In some embodiments, a recess 17a may be provided in stud nut 17 to receive wheel centering sleeve 24 therein as stud nut 17 drives wheel centering sleeve 24 into gap 44. The progression of installation of wheel centering sleeve 24 into gap 44 is shown from FIG. 21 to FIG. 24.

It is to be understood that, while useful with a variety of wheels 12, the centering sleeve of the present invention may also or instead be utilized in connection with other components in need of alignment with a vehicle hub. An example such component is a brake drum often employed in semitractors, which brake drum is secured to a hub 14 by receiving studs 16 through holes in the brake drum, in a manner similar to that described above with respect to wheel 12.

The invention has been described herein in considerable detail in order to comply with the patent statutes, and to provide those skilled in the art with the information needed to apply the novel principles and to construct and use embodiments of the invention as required. However, it is to be understood that various modifications can be accomplished without departing from the scope of the invention itself.

What is claimed is:

1. A wheel centering sleeve for engagement between a wheel stud and a wheel within a stud hole of the wheel to center the wheel about a hub, said wheel centering sleeve comprising:
  a body having an axis and a wall extending at least partially circumaxially about said axis, said wall having an exterior surface and an interior surface defining a first thickness therebetween, and first and second axial ends defining an axial length of said body, wherein said body includes a plurality of fins extending from said exterior surface between said first and second ends, said fins being at least one of: (i) more compressible than the wheel, and (ii) more friable than the wheel.

2. The wheel centering sleeve as in claim 1 wherein said body comprises a plastic material.

3. The wheel centering sleeve as in claim 2 wherein said body is metal-free.

4. The wheel centering sleeve as in claim 1 wherein said wall is substantially tubular.

5. The wheel centering sleeve as in claim 1 wherein said first thickness is substantially equivalent to a gap between the wheel and the wheel stud in the stud hole.

6. The wheel centering sleeve as in claim 1 wherein said plurality of said fins extend radially from said exterior surface.

7. The wheel centering sleeve as in claim 6 wherein said plurality of said fins are skew with respect to said axis.

8. The wheel centering sleeve as in claim 1 wherein said first end of said body is chamfered.

9. The wheel centering sleeve as in claim 8 wherein said second end includes a tool mating surface having one or more features specifically configured for engagement with a tool for rotating said body about said axis.

10. The wheel centering sleeve as in claim 9 wherein said one or more features include at least one of a recess and a protrusion.

11. A method for centering a wheel about a hub, wherein the wheel includes stud holes for receiving wheel studs, said method comprising:
  installing the wheel about the hub so that the wheel studs are received through the stud holes; and
  installing the wheel centering sleeve of claim 1 into a respective stud hole between the wheel stud and the wheel.

12. The method as in claim 11, including urging the wheel centering sleeve into the stud hole with a stud nut threadably engaged with the wheel stud.

13. The method as in claim 11, including urging the wheel centering sleeve into the stud hole with a tool configured to matingly engage with a tool mating surface of the wheel centering sleeve.

14. The method as in claim 13, including rotatably urging the wheel centering sleeve into the stud hole.

15. The method as in claim 11 wherein installing the wheel centering sleeve into the stud hole compresses at least a portion of the wheel centering sleeve.

16. The method as in claim 11 wherein installing the wheel centering sleeve into the stud hole disrupts said fins.

17. A kit for centering a wheel about a hub, said kit comprising a plurality of wheel centering sleeves as in claim 1.

18. A wheel centering sleeve for positioning a wheel concentrically about a hub, said sleeve being installable in an annular gap in a wheel hole between the wheel stud and the wheel, wherein the gap has a gap space defined radially between the wheel stud and the wheel when the wheel stud is concentrically within the wheel hole, said sleeve comprising a substantially cylindrical tubular wall defining a central axis passing through first and second open ends of said sleeve, said tubular wall having an interior surface defining an inner diameter, and an exterior surface having a plurality of fins extending radially outwardly therefrom and circumaxially spaced apart around said exterior surface, wherein said fins define an outer diameter of said sleeve, with an initial thickness of said sleeve being defined as one-half of the difference between said outer diameter and said inner diameter, said initial thickness being larger than the gap space.

19. The wheel centering sleeve as in claim 18 wherein said fins are oriented skew to said central axis.

20. A method for removing a centering sleeve from engagement with a respective stud extending from a vehicle hub through a mounting hole in a component, wherein the centering sleeve is installable in a gap in the mounting hole between the stud and the component, said centering sleeve comprising a substantially tubular wall defining a central axis passing through first and second open ends of said sleeve, said tubular wall having an interior surface defining an inner diameter, an exterior surface defining a sleeve thickness between said interior and exterior surfaces, and an aperture in said tubular wall and extending through said sleeve thickness, said method comprising:
  (a) inserting a tool into the aperture;
  (b) manipulating the tool to enlarge said inner diameter of said tubular wall; and
  (c) axially displacing the centering sleeve with respect to the stud.

21. The method as in claim 20 wherein said manipulating includes physical prying of said tubular wall adjacent to the aperture.

22. The method as in claim 20, including manipulating the tool to break said tubular wall.

23. A centering sleeve for aligning a component with a vehicle hub, the vehicle hub having studs extending therefrom and which are receivable through mounting holes in the component, wherein said centering sleeve is installable in a gap in the mounting hole between the stud and the component, with the gap having a gap space defined radially between the stud and the component when the stud is concentrically within the mounting hole, said centering sleeve comprising a substantially tubular wall defining a central axis passing through first and second open ends of said sleeve, said tubular wall comprising a plastic material and being radially compressible to be installable into the gap.

24. The centering sleeve as in claim 23 wherein said component is a wheel.

25. The centering sleeve as in claim 23 wherein said substantially tubular wall includes first and second axial ends defining an axial length.

26. The centering sleeve as in claim 25 wherein said first axial end is chamfered.

27. The centering sleeve as in claim 25 wherein said second end includes a tool mating surface having one or more engagement features.

28. A kit for aligning a component with a vehicle hub, said kit comprising:
(a) a centering sleeve as in claim 27; and
(b) a tool configured for rotating said centering sleeve about said central axis through engagement to said one or more engagement features, said tool having a head portion specifically configured for engagement with said one or more engagement features.

29. The kit as in claim 28 including a plurality of said centering sleeves.

30. A method for aligning a component with a vehicle hub, said method comprising:
(a) providing the kit of claim 28;
(b) mounting the component to the vehicle hub so that the studs extend through respective mounting holes of the component;
(c) positioning said centering sleeve circumaxially about a respective said stud, with said first end of said centering sleeve oriented toward said component;
(d) engaging said head portion of said tool to said one or more engagement features; and
(e) applying one or more of an axial force to said tool along said central axis and a rotational force to said tool circumaxially about said central axis while said head portion of said tool is engaged to said one or more engagement features, so that said first end of said centering sleeve is pressed into the gap.

31. The method as in claim 30, including:
(a) continuing to apply at least one of said axial force and said rotational force until said centering sleeve is fully installed in the gap.

32. A tool for installing and detaching a wheel centering sleeve with respect to a vehicle wheel, wherein said wheel centering sleeve has a substantially tubular wall with an interior surface defining an inner diameter and an exterior surface defining an exterior diameter and a sleeve thickness between said interior and exterior surfaces, said tool comprising:

a first portion having a channel and a channel axis, and first and second axially opposed open ends communicating with the channel, said first portion including a head adjacent to said first open end and being specifically configured to engage with one or more engagement features of the wheel centering sleeve; and
a second portion having a key with a substantially cylindrical insert portion having an outer diameter that is smaller diameter of the wheel centering sleeve, and a brace portion connecting said insert portion to a handle portion, said brace portion defining a bearing surface for contacting the centering sleeve.

33. The tool as in claim 32 wherein said brace portion is substantially cylindrical and has an outer diameter that is greater than the inner diameter of the wheel centering sleeve.

34. The tool as in claim 33 wherein said brace portion and said insert portion are coaxially arranged along a second axis that is substantially perpendicular to said channel axis.

35. A centering sleeve for aligning a component with a vehicle hub having a stud extending therefrom, the stud being receivable through a mounting hole in the component, and the centering sleeve being installable in a gap in the mounting hole between the stud and the component, with the gap having a gap space defined radially between the stud and the component when the stud is concentrically within the mounting hole, said centering sleeve comprising a tubular wall defining a central axis passing through first and second open ends of said centering sleeve, said tubular wall having an interior surface defining an inner diameter and an exterior surface defining an outer diameter, with an initial thickness of said sleeve being defined as the difference between the outer diameter and the inner diameter, the initial thickness being greater than the gap space.

36. The centering sleeve as in claim 35, including a plurality of fins extending radially outwardly from said exterior surface to an outer circumference, wherein the outer diameter is defined by the outer circumference.

37. The centering sleeve as in claim 35 wherein said tubular wall is installable into the gap space by being at least one of radially compressible and friable.

\* \* \* \* \*